(12) United States Patent
Ivey et al.

(10) Patent No.: US 9,101,026 B2
(45) Date of Patent: Aug. 4, 2015

(54) INTEGRATION OF LED LIGHTING WITH BUILDING CONTROLS

(71) Applicant: iLumisys, Inc., Troy, MI (US)

(72) Inventors: John Ivey, Farmington Hills, MI (US); David L. Simon, Grosse Pointe Woods, MI (US)

(73) Assignee: ILUMISYS, INC., Troy, MI (US)

( * ) Notice: Subject to any disclaimer, the term of this patent is extended or adjusted under 35 U.S.C. 154(b) by 0 days.

(21) Appl. No.: 14/064,757

(22) Filed: Oct. 28, 2013

(65) Prior Publication Data

US 2014/0055043 A1 Feb. 27, 2014

Related U.S. Application Data

(63) Continuation of application No. 13/491,961, filed on Jun. 8, 2012, now Pat. No. 8,571,716, which is a continuation of application No. 12/572,601, filed on Oct. 2, 2009, now Pat. No. 8,214,084.

(60) Provisional application No. 61/108,358, filed on Oct. 24, 2008.

(51) Int. Cl.
   *H05B 33/08* (2006.01)
   *H05B 37/02* (2006.01)
   *F24F 11/00* (2006.01)

(52) U.S. Cl.
   CPC ........ *H05B 33/0854* (2013.01); *H05B 33/0803* (2013.01); *H05B 37/0227* (2013.01); *F24F 11/0034* (2013.01)

(58) Field of Classification Search
   CPC ........... H05B 33/0854; H05B 33/0803; H05B 37/0227; F24F 11/0034
   USPC ............. 700/275, 276, 277, 295, 296, 297; 315/291, 307, 308, 315; 362/234, 253, 362/276; 340/815.45
   See application file for complete search history.

(56) References Cited

U.S. PATENT DOCUMENTS

D54,511 S  2/1920  Owen
D58,105 S  6/1921  Poritz
(Continued)

FOREIGN PATENT DOCUMENTS

CN  1584388 A  2/2005
CN  2766345 Y  3/2006
(Continued)

OTHER PUBLICATIONS

Best Practice Guide—Commercial Office Buildings—Central HVAC System. [online], [Retrieved on Jan. 17, 2008] Retrieved from FlexYour Power Organization web page using Internet <URL: http://www.fypower.org/bpg/module.html?b=offices&m+Central HVAC Systems&s=Contr . . . >.

(Continued)

*Primary Examiner* — Charles Kasenge
(74) *Attorney, Agent, or Firm* — Young, Basile, Hanlon & MacFarlane, P.C.

(57) ABSTRACT

An LED-based light can be installed in a conventional light fixture. The LED-based light can include a sensor operable to output a first signal indicative of whether an area of one or more of the rooms is in an occupied state or a non-occupied state, and the LED-based light can also include an LED controller operable to control at least one LED in the light in response to the first signal. Additionally, the LED-based light can include a transmitter operable to output a second signal indicative of whether the area is in the occupied state or the non-occupied state to a building environment regulator.

19 Claims, 1 Drawing Sheet

(56) References Cited

U.S. PATENT DOCUMENTS

| | | |
|---|---|---|
| D79,814 S | 11/1929 | Hoch |
| D80,419 S | 1/1930 | Kramer |
| D84,763 S | 7/1931 | Stange |
| D119,797 S | 4/1940 | Winkler et al. |
| D125,312 S | 2/1941 | Logan |
| 2,826,679 A | 3/1958 | Rosenberg |
| 2,909,097 A | 10/1959 | Alden et al. |
| 3,272,977 A | 9/1966 | Holmes |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,612,855 A | 10/1971 | Juhnke |
| 3,643,088 A | 2/1972 | Osteen et al. |
| 3,739,336 A | 6/1973 | Burland |
| 3,746,918 A | 7/1973 | Drucker et al. |
| 3,818,216 A | 6/1974 | Larraburu |
| 3,821,590 A | 6/1974 | Kosman et al. |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,969,720 A | 7/1976 | Nishino |
| 3,974,637 A | 8/1976 | Bergey et al. |
| 3,993,386 A | 11/1976 | Rowe |
| 4,001,571 A | 1/1977 | Martin |
| 4,009,394 A | 2/1977 | Mierzwinski |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,257,672 A | 3/1981 | Balliet |
| 4,261,029 A | 4/1981 | Mousset |
| 4,262,255 A | 4/1981 | Kokei et al. |
| 4,271,408 A | 6/1981 | Teshima et al. |
| 4,271,458 A | 6/1981 | George, Jr. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,344,117 A | 8/1982 | Niccum |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,521,835 A | 6/1985 | Meggs et al. |
| 4,531,114 A | 7/1985 | Topol et al. |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,669,033 A | 5/1987 | Lee |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,727,457 A | 2/1988 | Thillays |
| 4,739,454 A | 4/1988 | Federgreen |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,765,708 A | 8/1988 | Becker et al. |
| 4,767,172 A | 8/1988 | Hubble, III et al. |
| 4,771,274 A | 9/1988 | Havel |
| 4,780,621 A | 10/1988 | Bartleucci et al. |
| 4,794,373 A | 12/1988 | Harrison |
| 4,794,383 A | 12/1988 | Havel |
| 4,801,928 A | 1/1989 | Minter |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,851,972 A | 7/1989 | Altman |
| 4,854,701 A | 8/1989 | Noll et al. |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,904,988 A | 2/1990 | Nesbit et al. |
| 4,912,371 A | 3/1990 | Hamilton |
| 4,922,154 A | 5/1990 | Cacoub |
| 4,929,936 A | 5/1990 | Friedman et al. |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,977,351 A | 12/1990 | Bavaro et al. |
| 4,979,081 A | 12/1990 | Leach et al. |
| 4,979,180 A | 12/1990 | Muncheryan |
| 4,980,806 A | 12/1990 | Taylor et al. |
| 4,991,070 A | 2/1991 | Stob |
| 4,992,704 A | 2/1991 | Stinson |
| 5,001,609 A | 3/1991 | Gardner et al. |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,761 A | 7/1992 | Tanaka |

(56) References Cited

U.S. PATENT DOCUMENTS

| | | |
|---|---|---|
| 5,130,909 A | 7/1992 | Gross |
| 5,134,387 A | 7/1992 | Smith et al. |
| 5,136,483 A | 8/1992 | Schoniger et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,268,828 A | 12/1993 | Miura |
| 5,278,542 A | 1/1994 | Smith et al. |
| 5,281,961 A * | 1/1994 | Elwell ............................ 340/554 |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,341,988 A * | 8/1994 | Rein et al. .................... 236/49.3 |
| 5,344,068 A | 9/1994 | Haessig |
| 5,350,977 A | 9/1994 | Hamamoto et al. |
| 5,357,170 A | 10/1994 | Luchaco et al. |
| 5,365,411 A | 11/1994 | Rycroft et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,094 A | 4/1995 | Green et al. |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,473,522 A | 12/1995 | Kriz et al. |
| 5,475,300 A | 12/1995 | Havel |
| 5,481,441 A | 1/1996 | Stevens |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,639,158 A | 6/1997 | Sato |
| 5,640,061 A | 6/1997 | Bornhorst et al. |
| 5,640,141 A | 6/1997 | Myllymaki |
| 5,640,792 A | 6/1997 | O'Shea et al. |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,684,523 A | 11/1997 | Satoh et al. |
| 5,688,042 A | 11/1997 | Madadi et al. |
| 5,690,417 A | 11/1997 | Choate et al. |
| 5,697,695 A | 12/1997 | Lin et al. |
| 5,699,243 A | 12/1997 | Eckel et al. |
| 5,701,058 A | 12/1997 | Roth |
| 5,712,650 A | 1/1998 | Barlow |
| 5,713,655 A | 2/1998 | Blackman |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,781,108 A * | 7/1998 | Jacob et al. .................... 340/552 |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,831,522 A | 11/1998 | Weed et al. |
| 5,836,676 A | 11/1998 | Ando et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,870,233 A | 2/1999 | Benz et al. |
| 5,890,794 A | 4/1999 | Abtahi et al. |
| 5,893,633 A | 4/1999 | Saito et al. |
| 5,896,010 A | 4/1999 | Mikolajczak et al. |
| 5,904,415 A | 5/1999 | Robertson et al. |
| 5,907,742 A | 5/1999 | Johnson et al. |

(56) References Cited

U.S. PATENT DOCUMENTS

| | | | |
|---|---|---|---|
| 5,909,378 A | 6/1999 | De Milleville |
| 5,912,653 A | 6/1999 | Fitch |
| 5,917,287 A | 6/1999 | Haederle et al. |
| 5,917,534 A | 6/1999 | Rajeswaran |
| 5,921,660 A | 7/1999 | Yu |
| 5,924,784 A | 7/1999 | Chliwnyj et al. |
| 5,927,845 A | 7/1999 | Gustafson et al. |
| 5,934,792 A | 8/1999 | Camarota |
| 5,936,599 A | 8/1999 | Reymond |
| 5,943,802 A | 8/1999 | Tijanic |
| 5,946,209 A | 8/1999 | Eckel et al. |
| 5,949,347 A | 9/1999 | Wu |
| 5,951,145 A | 9/1999 | Iwasaki et al. |
| 5,952,680 A | 9/1999 | Strite |
| 5,959,547 A | 9/1999 | Tubel et al. |
| 5,961,072 A | 10/1999 | Bodle |
| 5,962,989 A | 10/1999 | Baker |
| 5,962,992 A | 10/1999 | Huang et al. |
| 5,963,185 A | 10/1999 | Havel |
| 5,966,069 A | 10/1999 | Zmurk et al. |
| 5,971,597 A * | 10/1999 | Baldwin et al. ............... 700/277 |
| 5,973,594 A * | 10/1999 | Baldwin et al. ............... 340/506 |
| 5,974,553 A | 10/1999 | Gandar |
| 5,980,064 A | 11/1999 | Metroyanis |
| 5,998,925 A | 12/1999 | Shimizu et al. |
| 5,998,928 A | 12/1999 | Hipp |
| 6,000,807 A | 12/1999 | Moreland |
| 6,007,209 A | 12/1999 | Pelka |
| 6,008,783 A | 12/1999 | Kitagawa et al. |
| 6,010,228 A | 1/2000 | Blackman et al. |
| 6,011,691 A | 1/2000 | Schreffler |
| 6,016,038 A | 1/2000 | Mueller et al. |
| 6,018,237 A | 1/2000 | Havel |
| 6,019,493 A | 2/2000 | Kuo et al. |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| 6,031,958 A | 2/2000 | McGaffigan |
| 6,036,335 A | 3/2000 | Openiano |
| 6,036,336 A | 3/2000 | Wu |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,074,074 A | 6/2000 | Marcus |
| 6,084,359 A | 7/2000 | Hetzel et al. |
| 6,086,220 A | 7/2000 | Lash et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,107,755 A | 8/2000 | Katyl et al. |
| 6,115,184 A | 9/2000 | Hubble, III et al. |
| 6,116,748 A | 9/2000 | George |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,135,620 A | 10/2000 | Marsh |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,153,985 A | 11/2000 | Grossman |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| D437,947 S | 2/2001 | Huang |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,203,180 B1 | 3/2001 | Fleischmann |
| 6,211,626 B1 | 4/2001 | Lys et al. |
| 6,215,409 B1 | 4/2001 | Blach |
| 6,217,190 B1 | 4/2001 | Altman et al. |
| 6,219,239 B1 | 4/2001 | Mellberg et al. |
| 6,227,679 B1 | 5/2001 | Zhang et al. |
| 6,234,645 B1 | 5/2001 | Börner et al. |
| 6,238,075 B1 | 5/2001 | Dealey, Jr. et al. |
| 6,240,665 B1 | 6/2001 | Brown et al. |
| 6,241,359 B1 | 6/2001 | Lin |
| 6,249,221 B1 | 6/2001 | Reed |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,290,140 B1 * | 9/2001 | Pesko et al. ............... 236/47 |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |
| 6,305,821 B1 | 10/2001 | Hsieh et al. |
| 6,307,331 B1 | 10/2001 | Bonasia et al. |
| 6,310,590 B1 | 10/2001 | Havel |
| 6,315,429 B1 | 11/2001 | Grandolfo |
| 6,323,832 B1 | 11/2001 | Nishizawa et al. |
| 6,325,651 B1 | 12/2001 | Nishihara et al. |
| 6,334,699 B1 | 1/2002 | Gladnick |
| 6,340,868 B1 | 1/2002 | Lys et al. |
| 6,354,714 B1 | 3/2002 | Rhodes |
| 6,361,186 B1 | 3/2002 | Slayden |
| 6,362,578 B1 | 3/2002 | Swanson et al. |
| 6,369,525 B1 | 4/2002 | Chang et al. |
| 6,371,637 B1 | 4/2002 | Atchinson et al. |
| 6,373,733 B1 | 4/2002 | Wu et al. |
| 6,379,022 B1 | 4/2002 | Amerson et al. |
| 6,380,865 B1 | 4/2002 | Pederson |
| D457,667 S | 5/2002 | Piepgras et al. |
| D457,669 S | 5/2002 | Piepgras et al. |
| D457,974 S | 5/2002 | Piepgras et al. |
| 6,388,393 B1 | 5/2002 | Illingworth |
| 6,388,396 B1 * | 5/2002 | Katyl et al. ............... 315/294 |
| 6,394,623 B1 | 5/2002 | Tsui |
| 6,396,216 B1 | 5/2002 | Noone et al. |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,411,045 B1 | 6/2002 | Nerone |
| 6,422,716 B2 | 7/2002 | Henrici et al. |
| 6,428,189 B1 | 8/2002 | Hochstein |
| 6,429,604 B1 | 8/2002 | Chang |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,464,373 B1 | 10/2002 | Petrick |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,511,204 B2 | 1/2003 | Emmel et al. |
| 6,517,218 B2 | 2/2003 | Hochstein |
| 6,521,879 B1 | 2/2003 | Rand et al. |
| 6,522,078 B1 * | 2/2003 | Okamoto et al. ............... 315/149 |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,540,381 B1 | 4/2003 | Douglass, II |
| 6,541,800 B2 | 4/2003 | Barnett et al. |

(56) References Cited

U.S. PATENT DOCUMENTS

| | | |
|---|---|---|
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Battig |
| 6,582,103 B1 | 6/2003 | Popovich et al. |
| 6,583,550 B2 | 6/2003 | Iwasa et al. |
| 6,583,573 B2 | 6/2003 | Bierman |
| D477,093 S | 7/2003 | Moriyama et al. |
| 6,585,393 B1 | 7/2003 | Brandes et al. |
| 6,586,890 B2 | 7/2003 | Min et al. |
| 6,587,049 B1 * | 7/2003 | Thacker .................. 340/573.1 |
| 6,590,343 B2 | 7/2003 | Pederson |
| 6,592,238 B2 | 7/2003 | Cleaver et al. |
| 6,594,369 B1 | 7/2003 | Une |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,609,813 B1 | 8/2003 | Showers et al. |
| 6,612,712 B2 | 9/2003 | Nepil |
| 6,612,717 B2 | 9/2003 | Yen |
| 6,612,729 B1 | 9/2003 | Hoffman |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,652,117 B2 | 11/2003 | Tsai |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Wynne Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,736,328 B1 * | 5/2004 | Takusagawa ................ 236/51 |
| 6,736,525 B2 | 5/2004 | Chin |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,768,047 B2 | 7/2004 | Chang et al. |
| 6,774,584 B2 * | 8/2004 | Lys et al. .................. 315/362 |
| 6,777,891 B2 | 8/2004 | Lys et al. |
| 6,781,329 B2 * | 8/2004 | Mueller et al. ............. 315/297 |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,799,864 B2 | 10/2004 | Bohler et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,814,470 B2 | 11/2004 | Rizkin et al. |
| 6,814,478 B2 | 11/2004 | Menke |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 * | 2/2005 | Leong et al. ............. 315/185 R |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 * | 3/2005 | Morgan et al. ............... 362/257 |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| D506,274 S | 6/2005 | Moriyama et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,926,419 B2 | 8/2005 | An |
| 6,936,968 B2 | 8/2005 | Cross et al. |
| 6,936,978 B2 * | 8/2005 | Morgan et al. ............... 315/291 |
| 6,940,230 B2 | 9/2005 | Myron et al. |
| 6,948,829 B2 | 9/2005 | Verdes et al. |
| 6,953,261 B1 | 10/2005 | Jiao et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 * | 11/2005 | Morgan et al. ............... 315/295 |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |
| 6,997,576 B1 | 2/2006 | Lodhie et al. |
| 6,999,318 B2 | 2/2006 | Newby |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,018,074 B2 | 3/2006 | Raby et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,029,145 B2 | 4/2006 | Frederick |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 * | 6/2006 | Leong et al. ............... 315/291 |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 | 10/2006 | Robertson et al. |
| 7,114,834 B2 | 10/2006 | Rivas et al. |
| 7,118,262 B2 | 10/2006 | Negley |

(56) References Cited

U.S. PATENT DOCUMENTS

| | | | |
|---|---|---|---|
| 7,119,503 B2 | 10/2006 | Kemper | |
| 7,120,560 B2 | 10/2006 | Williams et al. | |
| 7,121,679 B2 | 10/2006 | Fujimoto | |
| 7,122,976 B1 | 10/2006 | Null et al. | |
| 7,123,139 B2 * | 10/2006 | Sweeney | 340/521 |
| 7,128,442 B2 | 10/2006 | Lee et al. | |
| 7,128,454 B2 | 10/2006 | Kim et al. | |
| D532,532 S | 11/2006 | Maxik | |
| 7,132,635 B2 | 11/2006 | Dowling | |
| 7,132,785 B2 | 11/2006 | Ducharme | |
| 7,132,804 B2 | 11/2006 | Lys et al. | |
| 7,135,824 B2 | 11/2006 | Lys et al. | |
| 7,139,617 B1 | 11/2006 | Morgan et al. | |
| 7,144,135 B2 | 12/2006 | Martin et al. | |
| 7,153,002 B2 | 12/2006 | Kim et al. | |
| 7,161,311 B2 | 1/2007 | Mueller et al. | |
| 7,161,313 B2 | 1/2007 | Piepgras et al. | |
| 7,161,556 B2 | 1/2007 | Morgan et al. | |
| 7,164,110 B2 | 1/2007 | Pitigoi-Aron et al. | |
| 7,164,235 B2 | 1/2007 | Ito et al. | |
| 7,165,863 B1 | 1/2007 | Thomas et al. | |
| 7,165,866 B2 | 1/2007 | Li | |
| 7,167,777 B2 | 1/2007 | Budike, Jr. | |
| 7,168,843 B2 | 1/2007 | Striebel | |
| D536,468 S | 2/2007 | Crosby | |
| 7,178,941 B2 | 2/2007 | Roberge et al. | |
| 7,180,252 B2 | 2/2007 | Lys et al. | |
| D538,950 S | 3/2007 | Maxik | |
| D538,952 S | 3/2007 | Maxik et al. | |
| D538,962 S | 3/2007 | Elliott | |
| 7,186,003 B2 | 3/2007 | Dowling et al. | |
| 7,186,005 B2 | 3/2007 | Hulse | |
| 7,187,141 B2 * | 3/2007 | Mueller et al. | 315/362 |
| 7,190,126 B1 | 3/2007 | Paton | |
| 7,192,154 B2 | 3/2007 | Becker | |
| 7,198,387 B1 | 4/2007 | Gloisten et al. | |
| 7,201,491 B2 | 4/2007 | Bayat et al. | |
| 7,201,497 B2 | 4/2007 | Weaver, Jr. et al. | |
| 7,202,613 B2 | 4/2007 | Morgan et al. | |
| 7,204,615 B2 | 4/2007 | Arik et al. | |
| 7,204,622 B2 | 4/2007 | Dowling et al. | |
| 7,207,696 B1 | 4/2007 | Lin | |
| 7,210,818 B2 | 5/2007 | Luk et al. | |
| 7,210,957 B2 | 5/2007 | Mrakovich et al. | |
| 7,211,959 B1 | 5/2007 | Chou | |
| 7,213,934 B2 | 5/2007 | Zarian et al. | |
| 7,217,004 B2 | 5/2007 | Park et al. | |
| 7,217,012 B2 | 5/2007 | Southard et al. | |
| 7,217,022 B2 | 5/2007 | Ruffin | |
| 7,218,056 B1 | 5/2007 | Harwood | |
| 7,218,238 B2 | 5/2007 | Right et al. | |
| 7,220,015 B2 | 5/2007 | Dowling | |
| 7,220,018 B2 | 5/2007 | Crabb et al. | |
| 7,221,104 B2 | 5/2007 | Lys et al. | |
| 7,221,110 B2 | 5/2007 | Sears et al. | |
| 7,224,000 B2 | 5/2007 | Aanegola et al. | |
| 7,226,189 B2 | 6/2007 | Lee et al. | |
| 7,228,052 B1 | 6/2007 | Lin | |
| 7,228,190 B2 | 6/2007 | Dowling et al. | |
| 7,231,060 B2 | 6/2007 | Dowling et al. | |
| 7,233,115 B2 | 6/2007 | Lys | |
| 7,233,831 B2 | 6/2007 | Blackwell | |
| 7,236,366 B2 | 6/2007 | Chen | |
| 7,237,924 B2 | 7/2007 | Martineau et al. | |
| 7,237,925 B2 | 7/2007 | Mayer et al. | |
| 7,239,532 B1 | 7/2007 | Hsu et al. | |
| 7,241,038 B2 | 7/2007 | Naniwa et al. | |
| 7,242,152 B2 | 7/2007 | Dowling et al. | |
| 7,246,926 B2 | 7/2007 | Harwood | |
| 7,246,931 B2 | 7/2007 | Hsieh et al. | |
| 7,248,239 B2 | 7/2007 | Dowling et al. | |
| 7,249,269 B1 | 7/2007 | Motoyama | |
| 7,249,865 B2 | 7/2007 | Robertson | |
| D548,868 S | 8/2007 | Roberge et al. | |
| 7,252,408 B2 | 8/2007 | Mazzochette et al. | |
| 7,253,566 B2 | 8/2007 | Lys et al. | |
| 7,255,457 B2 | 8/2007 | Ducharme et al. | |
| 7,255,460 B2 | 8/2007 | Lee | |
| 7,256,554 B2 | 8/2007 | Lys | |
| 7,258,458 B2 | 8/2007 | Mochiachvili et al. | |
| 7,258,467 B2 | 8/2007 | Saccomanno et al. | |
| 7,259,528 B2 | 8/2007 | Pilz | |
| 7,262,439 B2 | 8/2007 | Setlur et al. | |
| 7,262,559 B2 | 8/2007 | Tripathi et al. | |
| D550,379 S | 9/2007 | Hoshikawa et al. | |
| 7,264,372 B2 | 9/2007 | Maglica | |
| 7,267,467 B2 | 9/2007 | Wu et al. | |
| 7,270,443 B2 | 9/2007 | Kurtz et al. | |
| 7,271,794 B1 | 9/2007 | Cheng et al. | |
| 7,273,300 B2 | 9/2007 | Mrakovich | |
| 7,274,045 B2 | 9/2007 | Chandran et al. | |
| 7,274,160 B2 | 9/2007 | Mueller et al. | |
| 7,274,183 B1 | 9/2007 | Gu et al. | |
| D553,267 S | 10/2007 | Yuen | |
| 7,285,801 B2 | 10/2007 | Eliashevich et al. | |
| 7,288,902 B1 | 10/2007 | Melanson | |
| 7,288,904 B2 | 10/2007 | Numeroli et al. | |
| 7,296,912 B2 | 11/2007 | Beauchamp | |
| 7,300,184 B2 | 11/2007 | Ichikawa et al. | |
| 7,300,192 B2 | 11/2007 | Mueller et al. | |
| D556,937 S | 12/2007 | Ly | |
| D557,854 S | 12/2007 | Lewis | |
| 7,303,300 B2 | 12/2007 | Dowling et al. | |
| 7,306,353 B2 | 12/2007 | Popovich et al. | |
| 7,307,391 B2 | 12/2007 | Shan | |
| 7,308,296 B2 | 12/2007 | Lys et al. | |
| 7,309,965 B2 | 12/2007 | Dowling et al. | |
| 7,318,658 B2 | 1/2008 | Wang et al. | |
| 7,319,244 B2 | 1/2008 | Liu et al. | |
| 7,319,246 B2 | 1/2008 | Soules et al. | |
| 7,321,191 B2 | 1/2008 | Setlur et al. | |
| 7,326,964 B2 | 2/2008 | Lim et al. | |
| 7,327,281 B2 | 2/2008 | Hutchison | |
| 7,329,024 B2 | 2/2008 | Lynch et al. | |
| 7,329,031 B2 | 2/2008 | Liaw et al. | |
| D563,589 S | 3/2008 | Hariri et al. | |
| 7,344,278 B2 | 3/2008 | Paravantsos | |
| 7,345,320 B2 | 3/2008 | Dahm | |
| 7,348,604 B2 | 3/2008 | Matheson | |
| 7,350,936 B2 | 4/2008 | Ducharme et al. | |
| 7,350,952 B2 | 4/2008 | Nishigaki | |
| 7,352,138 B2 | 4/2008 | Lys et al. | |
| 7,352,339 B2 | 4/2008 | Morgan et al. | |
| 7,353,071 B2 | 4/2008 | Blackwell et al. | |
| 7,358,679 B2 | 4/2008 | Lys et al. | |
| 7,358,929 B2 | 4/2008 | Mueller et al. | |
| 7,370,986 B2 | 5/2008 | Chan | |
| 7,374,327 B2 | 5/2008 | Schexnaider | |
| 7,378,805 B2 | 5/2008 | Oh et al. | |
| 7,378,976 B1 | 5/2008 | Paterno | |
| 7,385,359 B2 | 6/2008 | Dowling et al. | |
| 7,391,159 B2 | 6/2008 | Harwood | |
| D574,093 S | 7/2008 | Kitagawa et al. | |
| 7,396,142 B2 | 7/2008 | Laizure, Jr. et al. | |
| 7,396,146 B2 | 7/2008 | Wang | |
| 7,401,935 B2 | 7/2008 | VanderSchuit | |
| 7,401,945 B2 | 7/2008 | Zhang | |
| D576,749 S | 9/2008 | Kitagawa et al. | |
| 7,423,548 B2 | 9/2008 | Kontovich | |
| 7,427,840 B2 * | 9/2008 | Morgan et al. | 315/295 |
| 7,429,117 B2 | 9/2008 | Pohlert et al. | |
| 7,434,964 B1 | 10/2008 | Zheng et al. | |
| 7,438,441 B2 | 10/2008 | Sun et al. | |
| D580,089 S | 11/2008 | Ly et al. | |
| D581,556 S | 11/2008 | To et al. | |
| 7,449,847 B2 | 11/2008 | Schanberger et al. | |
| D582,577 S | 12/2008 | Yuen | |
| 7,466,082 B1 | 12/2008 | Snyder et al. | |
| 7,470,046 B2 | 12/2008 | Kao et al. | |
| D584,428 S | 1/2009 | Li et al. | |
| D584,429 S | 1/2009 | Pei et al. | |
| 7,476,002 B2 | 1/2009 | Wolf et al. | |
| 7,476,004 B2 | 1/2009 | Chan | |
| 7,478,924 B2 | 1/2009 | Robertson | |

(56) References Cited

U.S. PATENT DOCUMENTS

| | | | |
|---|---|---|---|
| 7,482,764 B2 * | 1/2009 | Morgan et al. | 315/312 |
| D586,484 S | 2/2009 | Liu et al. | |
| D586,928 S | 2/2009 | Liu et al. | |
| 7,490,957 B2 * | 2/2009 | Leong et al. | 362/249.05 |
| 7,497,596 B2 | 3/2009 | Ge | |
| 7,498,753 B2 * | 3/2009 | McAvoy et al. | 315/291 |
| 7,507,001 B2 * | 3/2009 | Kit | 362/276 |
| 7,510,299 B2 | 3/2009 | Timmermans et al. | |
| 7,510,400 B2 | 3/2009 | Glovatsky et al. | |
| 7,511,613 B2 * | 3/2009 | Wang | 340/539.26 |
| 7,514,876 B2 | 4/2009 | Roach, Jr. | |
| 7,520,635 B2 | 4/2009 | Wolf et al. | |
| 7,521,872 B2 | 4/2009 | Bruning | |
| 7,524,089 B2 | 4/2009 | Park | |
| D592,766 S | 5/2009 | Zhu et al. | |
| D593,223 S | 5/2009 | Komar | |
| 7,530,701 B2 | 5/2009 | Chan-Wing | |
| 7,534,002 B2 | 5/2009 | Yamaguchi et al. | |
| D594,999 S | 6/2009 | Uchida et al. | |
| 7,549,769 B2 | 6/2009 | Kim et al. | |
| 7,556,396 B2 | 7/2009 | Kuo et al. | |
| 7,559,663 B2 | 7/2009 | Wong et al. | |
| 7,562,998 B1 | 7/2009 | Yen | |
| D597,686 S | 8/2009 | Noh | |
| 7,569,981 B1 | 8/2009 | Ciancanelli | |
| 7,572,030 B2 | 8/2009 | Booth et al. | |
| 7,575,339 B2 | 8/2009 | Hung | |
| 7,579,786 B2 | 8/2009 | Soos | |
| 7,583,035 B2 | 9/2009 | Shteynberg et al. | |
| 7,583,901 B2 * | 9/2009 | Nakagawa et al. | 398/183 |
| 7,594,738 B1 | 9/2009 | Lin et al. | |
| D601,726 S | 10/2009 | Mollaert et al. | |
| 7,598,681 B2 * | 10/2009 | Lys et al. | 315/291 |
| 7,598,684 B2 * | 10/2009 | Lys et al. | 315/307 |
| 7,598,686 B2 | 10/2009 | Lys et al. | |
| 7,600,907 B2 | 10/2009 | Liu et al. | |
| 7,602,559 B2 | 10/2009 | Jang et al. | |
| 7,618,157 B1 | 11/2009 | Galvez et al. | |
| 7,619,366 B2 | 11/2009 | Diederiks | |
| 7,635,201 B2 | 12/2009 | Deng | |
| 7,635,214 B2 | 12/2009 | Perlo | |
| 7,639,517 B2 | 12/2009 | Zhou et al. | |
| 7,648,251 B2 | 1/2010 | Whitehouse et al. | |
| 7,649,327 B2 | 1/2010 | Peng | |
| D610,724 S | 2/2010 | Chiang et al. | |
| 7,661,839 B2 | 2/2010 | Tsai | |
| D612,528 S | 3/2010 | McGrath et al. | |
| 7,690,813 B2 | 4/2010 | Kanamori et al. | |
| 7,710,047 B2 | 5/2010 | Shteynberg et al. | |
| 7,710,253 B1 | 5/2010 | Fredricks | |
| 7,712,918 B2 | 5/2010 | Siemiet et al. | |
| 7,748,886 B2 | 7/2010 | Pazula et al. | |
| 7,758,207 B1 | 7/2010 | Zhou et al. | |
| 7,759,881 B1 | 7/2010 | Melanson | |
| D621,975 S | 8/2010 | Wang | |
| 7,784,966 B2 | 8/2010 | Verfuerth et al. | |
| 7,800,511 B1 | 9/2010 | Hutchison et al. | |
| 7,815,338 B2 | 10/2010 | Siemiet et al. | |
| 7,815,341 B2 | 10/2010 | Steedly et al. | |
| 7,828,471 B2 | 11/2010 | Lin | |
| 7,843,150 B2 | 11/2010 | Wang et al. | |
| 7,848,702 B2 | 12/2010 | Ho et al. | |
| 7,850,341 B2 | 12/2010 | Mrakovich et al. | |
| 7,855,641 B1 * | 12/2010 | Okafo | 340/545.8 |
| RE42,161 E | 2/2011 | Hochstein | |
| 7,878,683 B2 | 2/2011 | Logan et al. | |
| 7,887,216 B2 | 2/2011 | Patrick | |
| 7,887,226 B2 | 2/2011 | Huang et al. | |
| 7,889,051 B1 | 2/2011 | Billig et al. | |
| D634,452 S | 3/2011 | de Visser | |
| 7,904,209 B2 * | 3/2011 | Podgorny et al. | 700/276 |
| 7,926,975 B2 | 4/2011 | Siemiet et al. | |
| 7,938,562 B2 | 5/2011 | Ivey et al. | |
| 7,946,729 B2 | 5/2011 | Ivey et al. | |
| 7,952,292 B2 | 5/2011 | Vegter et al. | |
| 7,976,196 B2 | 7/2011 | Ivey et al. | |
| 7,990,070 B2 | 8/2011 | Nerone | |
| 7,997,770 B1 | 8/2011 | Meurer | |
| 8,013,472 B2 | 9/2011 | Adest et al. | |
| D650,097 S | 12/2011 | Trumble et al. | |
| D650,494 S | 12/2011 | Tsao et al. | |
| D652,968 S | 1/2012 | Aguiar et al. | |
| 8,093,823 B1 | 1/2012 | Ivey et al. | |
| D654,192 S | 2/2012 | Maxik et al. | |
| 8,118,447 B2 | 2/2012 | Simon et al. | |
| 8,136,738 B1 * | 3/2012 | Kopp | 236/51 |
| 8,147,091 B2 | 4/2012 | Hsia et al. | |
| 8,159,152 B1 | 4/2012 | Salessi | |
| D660,472 S | 5/2012 | Aguiar et al. | |
| 8,167,452 B2 | 5/2012 | Chou | |
| 8,177,388 B2 | 5/2012 | Yen | |
| 8,179,037 B2 | 5/2012 | Chan et al. | |
| 8,183,989 B2 | 5/2012 | Tsai | |
| D662,236 S | 6/2012 | Matsushita | |
| 8,203,445 B2 | 6/2012 | Recker et al. | |
| 8,214,084 B2 * | 7/2012 | Ivey et al. | 700/275 |
| 8,247,985 B2 | 8/2012 | Timmermans et al. | |
| 8,251,544 B2 | 8/2012 | Ivey et al. | |
| 8,262,249 B2 | 9/2012 | Hsia et al. | |
| 8,272,764 B2 | 9/2012 | Son | |
| 8,287,144 B2 | 10/2012 | Pedersen et al. | |
| 8,297,788 B2 | 10/2012 | Bishop | |
| 8,299,722 B2 | 10/2012 | Melanson | |
| 8,304,993 B2 | 11/2012 | Tzou et al. | |
| 8,313,213 B2 | 11/2012 | Lin et al. | |
| 8,319,407 B2 | 11/2012 | Ke | |
| 8,319,433 B2 | 11/2012 | Lin et al. | |
| 8,319,437 B2 | 11/2012 | Carlin et al. | |
| 8,322,878 B2 | 12/2012 | Hsia et al. | |
| 8,324,817 B2 | 12/2012 | Ivey et al. | |
| 8,337,071 B2 | 12/2012 | Negley et al. | |
| 8,376,579 B2 | 2/2013 | Chang | |
| 8,376,588 B2 | 2/2013 | Yen | |
| 8,382,322 B2 | 2/2013 | Bishop | |
| 8,382,327 B2 | 2/2013 | Timmermans et al. | |
| 8,382,502 B2 | 2/2013 | Cao et al. | |
| 8,388,179 B2 | 3/2013 | Hood et al. | |
| 8,398,275 B2 | 3/2013 | Wang et al. | |
| 8,403,692 B2 | 3/2013 | Cao et al. | |
| 8,405,314 B2 | 3/2013 | Jensen | |
| 8,434,914 B2 | 5/2013 | Li et al. | |
| 8,454,193 B2 | 6/2013 | Simon et al. | |
| 8,482,212 B1 | 7/2013 | Ivey et al. | |
| 8,571,716 B2 * | 10/2013 | Ivey et al. | 700/275 |
| 2001/0033488 A1 | 10/2001 | Chliwnyj et al. | |
| 2001/0045803 A1 | 11/2001 | Cencur | |
| 2002/0011801 A1 | 1/2002 | Chang | |
| 2002/0015297 A1 | 2/2002 | Hayashi et al. | |
| 2002/0038157 A1 | 3/2002 | Dowling et al. | |
| 2002/0041159 A1 | 4/2002 | Kaping | |
| 2002/0044066 A1 | 4/2002 | Dowling et al. | |
| 2002/0047516 A1 | 4/2002 | Iwasa et al. | |
| 2002/0047569 A1 | 4/2002 | Dowling et al. | |
| 2002/0047624 A1 | 4/2002 | Stam et al. | |
| 2002/0047628 A1 | 4/2002 | Morgan et al. | |
| 2002/0048169 A1 | 4/2002 | Dowling et al. | |
| 2002/0057061 A1 | 5/2002 | Mueller et al. | |
| 2002/0060526 A1 | 5/2002 | Timmermans et al. | |
| 2002/0070688 A1 | 6/2002 | Dowling et al. | |
| 2002/0074559 A1 | 6/2002 | Dowling et al. | |
| 2002/0074958 A1 | 6/2002 | Crenshaw | |
| 2002/0078221 A1 | 6/2002 | Blackwell et al. | |
| 2002/0101197 A1 | 8/2002 | Lys et al. | |
| 2002/0113555 A1 | 8/2002 | Lys et al. | |
| 2002/0130627 A1 | 9/2002 | Morgan et al. | |
| 2002/0145394 A1 | 10/2002 | Morgan et al. | |
| 2002/0145869 A1 | 10/2002 | Dowling | |
| 2002/0152045 A1 | 10/2002 | Dowling et al. | |
| 2002/0152298 A1 | 10/2002 | Kikta et al. | |
| 2002/0153851 A1 | 10/2002 | Morgan et al. | |
| 2002/0158583 A1 | 10/2002 | Lys et al. | |
| 2002/0163316 A1 | 11/2002 | Lys et al. | |
| 2002/0171365 A1 | 11/2002 | Morgan et al. | |
| 2002/0171377 A1 | 11/2002 | Mueller et al. | |

(56) References Cited

U.S. PATENT DOCUMENTS

| | | |
|---|---|---|
| 2002/0171378 A1 | 11/2002 | Morgan et al. |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0021117 A1 | 1/2003 | Chan |
| 2003/0028260 A1 | 2/2003 | Blackwell |
| 2003/0031015 A1 | 2/2003 | Ishibashi |
| 2003/0048641 A1 | 3/2003 | Alexanderson et al. |
| 2003/0052599 A1 | 3/2003 | Sun |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0218879 A1 | 11/2003 | Tieszen |
| 2003/0222587 A1 | 12/2003 | Dowling, Jr. et al. |
| 2003/0234342 A1 | 12/2003 | Gaines et al. |
| 2004/0003545 A1 | 1/2004 | Gillespie |
| 2004/0007980 A1 | 1/2004 | Shibata |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0113568 A1 | 6/2004 | Dowling et al. |
| 2004/0114371 A1 | 6/2004 | Lea et al. |
| 2004/0116039 A1 | 6/2004 | Mueller et al. |
| 2004/0124782 A1 | 7/2004 | Yu |
| 2004/0130908 A1 | 7/2004 | McClurg et al. |
| 2004/0130909 A1 | 7/2004 | Mueller et al. |
| 2004/0141321 A1 | 7/2004 | Dowling et al. |
| 2004/0145886 A1 | 7/2004 | Fatemi et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189262 A1 | 9/2004 | McGrath |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0223328 A1 | 11/2004 | Lee et al. |
| 2004/0240890 A1 | 12/2004 | Lys et al. |
| 2004/0251854 A1 | 12/2004 | Matsuda et al. |
| 2004/0257007 A1 | 12/2004 | Lys et al. |
| 2005/0013133 A1 | 1/2005 | Yeh |
| 2005/0023536 A1 | 2/2005 | Shackle |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0093488 A1 | 5/2005 | Hung et al. |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0162093 A1 | 7/2005 | Timmermans et al. |
| 2005/0162100 A1 | 7/2005 | Romano et al. |
| 2005/0162101 A1* | 7/2005 | Leong et al. .................. 315/291 |
| 2005/0166634 A1 | 8/2005 | Lieberman et al. |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0201112 A1 | 9/2005 | Machi et al. |
| 2005/0206529 A1 | 9/2005 | St.-Germain |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0242742 A1 | 11/2005 | Cheang et al. |
| 2005/0243577 A1 | 11/2005 | Moon |
| 2005/0248299 A1 | 11/2005 | Chemel et al. |
| 2005/0253533 A1 | 11/2005 | Lys et al. |
| 2005/0259424 A1 | 11/2005 | Zampini, II et al. |
| 2005/0264474 A1 | 12/2005 | Rast |
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0281030 A1* | 12/2005 | Leong et al. .................. 362/234 |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0044152 A1* | 3/2006 | Wang .......................... 340/825 |
| 2006/0050509 A9 | 3/2006 | Dowling et al. |
| 2006/0050514 A1 | 3/2006 | Opolka |
| 2006/0056855 A1* | 3/2006 | Nakagawa et al. ........... 398/183 |
| 2006/0066447 A1 | 3/2006 | Davenport et al. |
| 2006/0076908 A1 | 4/2006 | Morgan et al. |
| 2006/0081863 A1 | 4/2006 | Kim et al. |
| 2006/0091826 A1 | 5/2006 | Chen |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0196953 A1* | 9/2006 | Simon et al. ................. 236/46 R |
| 2006/0197661 A1 | 9/2006 | Tracy et al. |
| 2006/0198128 A1 | 9/2006 | Piepgras et al. |
| 2006/0208667 A1 | 9/2006 | Lys et al. |

(56) References Cited

U.S. PATENT DOCUMENTS

| | | |
|---|---|---|
| 2006/0215422 A1 | 9/2006 | Laizure, Jr. et al. |
| 2006/0220595 A1 | 10/2006 | Lu |
| 2006/0221606 A1 | 10/2006 | Dowling |
| 2006/0221619 A1 | 10/2006 | Nishigaki |
| 2006/0227558 A1 | 10/2006 | Osawa et al. |
| 2006/0232974 A1 | 10/2006 | Lee et al. |
| 2006/0238884 A1 | 10/2006 | Jang et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0265921 A1 | 11/2006 | Korall et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0035538 A1 | 2/2007 | Garcia et al. |
| 2007/0035965 A1 | 2/2007 | Holst |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0057805 A1* | 3/2007 | Gomez ..................... 340/691.2 |
| 2007/0064419 A1 | 3/2007 | Gandhi |
| 2007/0064425 A1 | 3/2007 | Frecska et al. |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0115658 A1 | 5/2007 | Mueller et al. |
| 2007/0115665 A1 | 5/2007 | Mueller et al. |
| 2007/0120463 A1 | 5/2007 | Hayashi et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0146126 A1 | 6/2007 | Wang |
| 2007/0147046 A1 | 6/2007 | Arik et al. |
| 2007/0152797 A1 | 7/2007 | Chemel et al. |
| 2007/0152808 A1 | 7/2007 | LaCasse |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0165405 A1 | 7/2007 | Chen |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0200725 A1 | 8/2007 | Fredericks et al. |
| 2007/0205712 A1 | 9/2007 | Radkov et al. |
| 2007/0206375 A1 | 9/2007 | Piepgras et al. |
| 2007/0211461 A1 | 9/2007 | Harwood |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0236358 A1 | 10/2007 | Street et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247450 A1 | 10/2007 | Lee |
| 2007/0247842 A1 | 10/2007 | Zampini et al. |
| 2007/0247847 A1 | 10/2007 | Villard |
| 2007/0247851 A1 | 10/2007 | Villard |
| 2007/0252161 A1 | 11/2007 | Meis et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1* | 1/2008 | Lys ........................... 315/247 |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0024067 A1 | 1/2008 | Ishibashi |
| 2008/0029720 A1 | 2/2008 | Li |
| 2008/0037226 A1 | 2/2008 | Shin et al. |
| 2008/0037245 A1 | 2/2008 | Chan |
| 2008/0037284 A1 | 2/2008 | Rudisill |
| 2008/0049434 A1 | 2/2008 | Marsh |
| 2008/0055894 A1 | 3/2008 | Deng |
| 2008/0062680 A1 | 3/2008 | Timmermans et al. |
| 2008/0068838 A1 | 3/2008 | Galke et al. |
| 2008/0068839 A1 | 3/2008 | Matheson |
| 2008/0074872 A1 | 3/2008 | Panotopoulos |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094819 A1 | 4/2008 | Vaish |
| 2008/0094837 A1 | 4/2008 | Dobbins et al. |
| 2008/0129211 A1 | 6/2008 | Lin et al. |
| 2008/0130267 A1 | 6/2008 | Dowling et al. |
| 2008/0150444 A1 | 6/2008 | Usui et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0185961 A1 | 8/2008 | Hong |
| 2008/0186704 A1 | 8/2008 | Chou et al. |
| 2008/0192436 A1 | 8/2008 | Peng et al. |
| 2008/0198598 A1 | 8/2008 | Ward |
| 2008/0211386 A1 | 9/2008 | Choi et al. |
| 2008/0211419 A1 | 9/2008 | Garrity |
| 2008/0218993 A1 | 9/2008 | Li |
| 2008/0224629 A1 | 9/2008 | Melanson |
| 2008/0224636 A1 | 9/2008 | Melanson |
| 2008/0253125 A1 | 10/2008 | Kang et al. |
| 2008/0258631 A1 | 10/2008 | Wu et al. |
| 2008/0258647 A1 | 10/2008 | Scianna |
| 2008/0278092 A1 | 11/2008 | Lys et al. |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0298080 A1 | 12/2008 | Wu et al. |
| 2008/0310119 A1 | 12/2008 | Giacoma |
| 2008/0315773 A1 | 12/2008 | Pang |
| 2008/0315784 A1 | 12/2008 | Tseng |
| 2009/0002995 A1 | 1/2009 | Lee et al. |
| 2009/0010022 A1 | 1/2009 | Tsai |
| 2009/0016063 A1 | 1/2009 | Hu |
| 2009/0021140 A1 | 1/2009 | Takasu et al. |
| 2009/0032604 A1* | 2/2009 | Miller ............................ 236/47 |
| 2009/0033513 A1* | 2/2009 | Salsbury et al. ........... 340/825.2 |
| 2009/0046473 A1 | 2/2009 | Tsai et al. |
| 2009/0052186 A1 | 2/2009 | Xue |
| 2009/0059557 A1 | 3/2009 | Tanaka |
| 2009/0059559 A1 | 3/2009 | Pabst et al. |
| 2009/0059603 A1 | 3/2009 | Recker et al. |
| 2009/0065596 A1* | 3/2009 | Seem et al. ..................... 236/51 |
| 2009/0067170 A1 | 3/2009 | Bloemen et al. |

(56) References Cited

U.S. PATENT DOCUMENTS

| | | |
|---|---|---|
| 2009/0067182 A1 | 3/2009 | Hsu et al. |
| 2009/0073693 A1 | 3/2009 | Nall et al. |
| 2009/0085500 A1* | 4/2009 | Zampini et al. ............... 315/297 |
| 2009/0086492 A1 | 4/2009 | Meyer |
| 2009/0091929 A1 | 4/2009 | Faubion |
| 2009/0091938 A1 | 4/2009 | Jacobson et al. |
| 2009/0101930 A1 | 4/2009 | Li |
| 2009/0115597 A1* | 5/2009 | Giacalone .................... 340/506 |
| 2009/0139690 A1 | 6/2009 | Maerz et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0189548 A1 | 7/2009 | Huang et al. |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0219713 A1 | 9/2009 | Siemiet et al. |
| 2009/0231831 A1 | 9/2009 | Hsiao et al. |
| 2009/0268461 A1 | 10/2009 | Deak et al. |
| 2009/0273924 A1 | 11/2009 | Chiang |
| 2009/0273926 A1 | 11/2009 | Deng |
| 2009/0284169 A1 | 11/2009 | Valois |
| 2009/0290334 A1 | 11/2009 | Ivey et al. |
| 2009/0295776 A1 | 12/2009 | Yu et al. |
| 2009/0296381 A1 | 12/2009 | Dubord |
| 2009/0303720 A1 | 12/2009 | McGrath |
| 2009/0316408 A1 | 12/2009 | Villard |
| 2010/0008085 A1 | 1/2010 | Ivey et al. |
| 2010/0019689 A1 | 1/2010 | Shan |
| 2010/0027259 A1 | 2/2010 | Simon et al. |
| 2010/0033095 A1 | 2/2010 | Sadwick |
| 2010/0033964 A1 | 2/2010 | Choi et al. |
| 2010/0046210 A1 | 2/2010 | Mathai et al. |
| 2010/0046222 A1 | 2/2010 | Yang |
| 2010/0071946 A1 | 3/2010 | Hashimoto |
| 2010/0073944 A1 | 3/2010 | Chen |
| 2010/0079085 A1 | 4/2010 | Wendt et al. |
| 2010/0096992 A1 | 4/2010 | Yamamoto et al. |
| 2010/0096998 A1 | 4/2010 | Beers |
| 2010/0103664 A1 | 4/2010 | Simon et al. |
| 2010/0103673 A1 | 4/2010 | Ivey et al. |
| 2010/0106306 A1* | 4/2010 | Simon et al. .................. 700/276 |
| 2010/0109550 A1 | 5/2010 | Huda et al. |
| 2010/0109558 A1 | 5/2010 | Chew |
| 2010/0141173 A1 | 6/2010 | Negrete |
| 2010/0148650 A1 | 6/2010 | Wu et al. |
| 2010/0149806 A1 | 6/2010 | Yiu |
| 2010/0157608 A1 | 6/2010 | Chen et al. |
| 2010/0164404 A1 | 7/2010 | Shao et al. |
| 2010/0181178 A1 | 7/2010 | Chang et al. |
| 2010/0201269 A1 | 8/2010 | Tzou et al. |
| 2010/0207547 A1 | 8/2010 | Kuroki et al. |
| 2010/0220469 A1 | 9/2010 | Ivey et al. |
| 2010/0237790 A1 | 9/2010 | Peng |
| 2010/0265732 A1 | 10/2010 | Liu |
| 2010/0270925 A1 | 10/2010 | Withers |
| 2010/0277069 A1 | 11/2010 | Janik et al. |
| 2010/0289418 A1 | 11/2010 | Langovsky |
| 2010/0308733 A1 | 12/2010 | Shao |
| 2010/0309652 A1 | 12/2010 | Shen et al. |
| 2010/0320922 A1 | 12/2010 | Palazzol et al. |
| 2011/0006658 A1 | 1/2011 | Chan et al. |
| 2011/0090682 A1 | 4/2011 | Zheng et al. |
| 2011/0109454 A1 | 5/2011 | McSheffrey, Sr. |
| 2011/0112661 A1 | 5/2011 | Jung et al. |
| 2011/0156584 A1 | 6/2011 | Kim |
| 2011/0176298 A1 | 7/2011 | Meurer et al. |
| 2011/0199723 A1 | 8/2011 | Sato |
| 2011/0199769 A1 | 8/2011 | Bretschneider et al. |
| 2011/0204777 A1 | 8/2011 | Lenk |
| 2011/0291588 A1 | 12/2011 | Tagare |
| 2012/0014086 A1 | 1/2012 | Jonsson |
| 2012/0043892 A1 | 2/2012 | Visser et al. |
| 2012/0063140 A1 | 3/2012 | Kong |
| 2012/0080994 A1 | 4/2012 | Chin et al. |
| 2012/0081891 A1 | 4/2012 | Tung et al. |
| 2012/0098439 A1 | 4/2012 | Recker et al. |
| 2012/0106144 A1 | 5/2012 | Chang |
| 2012/0113628 A1 | 5/2012 | Burrow et al. |
| 2012/0127726 A1 | 5/2012 | Yen |
| 2012/0146503 A1 | 6/2012 | Negley et al. |
| 2012/0147597 A1 | 6/2012 | Farmer |
| 2012/0153865 A1 | 6/2012 | Rolfes et al. |
| 2012/0155073 A1 | 6/2012 | McCanless et al. |
| 2012/0161666 A1 | 6/2012 | Antony et al. |
| 2012/0194086 A1 | 8/2012 | Liu et al. |
| 2012/0195032 A1 | 8/2012 | Shew |
| 2012/0212951 A1 | 8/2012 | Lai et al. |
| 2012/0212953 A1 | 8/2012 | Bloom et al. |
| 2012/0230044 A1 | 9/2012 | Zhang et al. |
| 2012/0236533 A1 | 9/2012 | Nakamura et al. |
| 2012/0236554 A1 | 9/2012 | Rust |
| 2012/0243216 A1 | 9/2012 | Lai et al. |
| 2012/0243217 A1 | 9/2012 | Szprengiel et al. |
| 2012/0274214 A1 | 11/2012 | Radermacher et al. |
| 2012/0275154 A1 | 11/2012 | Hood et al. |
| 2012/0293991 A1 | 11/2012 | Lin |
| 2012/0293996 A1 | 11/2012 | Thomas et al. |
| 2012/0300445 A1 | 11/2012 | Chu et al. |
| 2012/0300468 A1 | 11/2012 | Chang et al. |
| 2012/0300486 A1 | 11/2012 | Matsushita et al. |
| 2012/0307524 A1 | 12/2012 | Schapira et al. |
| 2012/0320598 A1 | 12/2012 | Son |
| 2013/0039051 A1 | 2/2013 | Wu |
| 2013/0044471 A1 | 2/2013 | Chen |
| 2013/0044476 A1 | 2/2013 | Bretschneider et al. |
| 2013/0050997 A1 | 2/2013 | Bretschneider et al. |
| 2013/0050998 A1 | 2/2013 | Chu et al. |
| 2013/0057146 A1 | 3/2013 | Chao |
| 2013/0058079 A1 | 3/2013 | Dellian et al. |
| 2013/0063944 A1 | 3/2013 | Lodhie et al. |
| 2013/0077297 A1 | 3/2013 | Wu et al. |
| 2013/0094200 A1 | 4/2013 | Dellian et al. |
| 2013/0148349 A1 | 6/2013 | Pasqualini et al. |
| 2013/0200797 A1 | 8/2013 | Timmermans et al. |
| 2013/0201690 A1 | 8/2013 | Vissenberg et al. |
| 2013/0206597 A1 | 8/2013 | Wang et al. |
| 2013/0221867 A1 | 8/2013 | Deppe et al. |
| 2013/0258668 A1 | 10/2013 | Dellian et al. |

FOREIGN PATENT DOCUMENTS

| | | |
|---|---|---|
| CN | 2869556 Y | 2/2007 |
| CN | 101016976 A | 8/2007 |
| CN | 101075605 A | 11/2007 |
| CN | 201129681 Y | 10/2008 |
| CN | 201184574 Y | 1/2009 |
| CN | 101737664 A1 | 6/2010 |
| DE | 19651140 A1 | 6/1997 |
| DE | 19624087 A1 | 12/1997 |
| DE | 29819966 U1 | 3/1999 |
| DE | 29900320 U1 | 5/1999 |
| DE | 29817609 U1 | 1/2000 |
| DE | 20018865 U1 | 2/2001 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 | 1/1995 |
| EP | 0432848 B1 | 4/1995 |
| EP | 0659531 A1 | 6/1995 |
| EP | 0403001 B1 | 8/1995 |
| EP | 0525876 | 5/1996 |
| EP | 0714556 | 1/1999 |
| EP | 0889283 A1 | 7/1999 |

(56) References Cited

FOREIGN PATENT DOCUMENTS

| | | |
|---|---|---|
| EP | 0458408 B1 | 9/1999 |
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 | 12/2005 |
| EP | 1624728 A1 | 2/2006 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 | 6/2007 |
| EP | 0922305 B1 | 8/2007 |
| EP | 0922306 B1 | 8/2007 |
| EP | 1194918 B1 | 8/2007 |
| EP | 1833035 A1 | 9/2007 |
| EP | 1048085 B1 | 11/2007 |
| EP | 1852648 A1 | 11/2007 |
| EP | 1763650 B1 | 12/2007 |
| EP | 1776722 B1 | 1/2008 |
| EP | 1873012 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1000522 B1 | 12/2008 |
| EP | 1502483 B1 | 12/2008 |
| EP | 1576858 B1 | 12/2008 |
| EP | 1646092 B1 | 1/2009 |
| EP | 1579736 B1 | 2/2009 |
| EP | 1889519 | 3/2009 |
| EP | 1537354 B1 | 4/2009 |
| EP | 1518445 B1 | 5/2009 |
| EP | 1337784 B1 | 6/2009 |
| EP | 2013530 B1 | 8/2009 |
| EP | 1461982 B1 | 9/2009 |
| EP | 2333407 A1 | 6/2011 |
| EP | 2430888 | 3/2012 |
| EP | 2469155 A1 | 6/2012 |
| EP | 2573457 A1 | 3/2013 |
| EP | 2554895 A1 | 6/2013 |
| FR | 2813115 | 2/2002 |
| GB | 2215024 A | 9/1989 |
| GB | 2324901 A | 11/1998 |
| GB | 2447257 A | 9/2008 |
| GB | 2472345 A | 2/2011 |
| GB | 2486410 A | 6/2012 |
| GB | 2495647 A | 4/2013 |
| JP | S68248271A A | 10/1987 |
| JP | 06-054289 | 2/1994 |
| JP | H6-54103 U | 7/1994 |
| JP | 07-249467 | 9/1995 |
| JP | 7264036 | 10/1995 |
| JP | 08-162677 A | 6/1996 |
| JP | H11-135274 A | 5/1999 |
| JP | H11-162234 A | 6/1999 |
| JP | H11-260125 A | 9/1999 |
| JP | 2001-238272 A | 8/2001 |
| JP | 2001-291406 A | 10/2001 |
| JP | 2002-141555 A | 5/2002 |
| JP | 3098271 U | 2/2004 |
| JP | 2004-119078 A | 4/2004 |
| JP | 2004-273234 A | 9/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |
| JP | 2005-322866 A | 12/2006 |
| JP | 2007-227342 A | 9/2007 |
| JP | 3139714 U | 2/2008 |
| JP | 2008-186758 A | 8/2008 |
| JP | 2008-258124 A | 10/2008 |
| JP | 2008-293753 A | 12/2008 |
| JP | 3154200 | 9/2009 |
| JP | 2010-15754 | 1/2010 |
| JP | 2010-192229 A1 | 9/2010 |
| JP | 2010-205553 A | 9/2010 |
| JP | 5102530 B2 | 12/2012 |
| KR | 10-2004-0008244 A | 1/2004 |
| KR | 10-2006-0112113 A | 10/2006 |
| KR | 20-0430022 Y1 | 11/2006 |
| KR | 10-2006-0133784 A | 12/2006 |
| KR | 10-2007-0063595 A | 6/2007 |
| KR | 10-0781652 | 12/2007 |
| KR | 10-0844538 B1 | 7/2008 |
| KR | 10-0888669 B1 | 3/2009 |
| KR | 10-0927851 B1 | 11/2009 |
| TW | M337036 | 7/2008 |
| TW | M349465 U | 1/2009 |
| WO | WO9906759 A1 | 2/1999 |
| WO | WO9910867 A1 | 3/1999 |
| WO | WO9931560 A2 | 6/1999 |
| WO | WO9945312 A1 | 9/1999 |
| WO | WO9957945 A1 | 11/1999 |
| WO | WO0001067 A2 | 1/2000 |
| WO | WO0225842 A2 | 3/2002 |
| WO | WO02061330 A2 | 8/2002 |
| WO | WO02069306 A2 | 9/2002 |
| WO | WO02091805 A2 | 11/2002 |
| WO | WO02098182 A2 | 12/2002 |
| WO | WO02099780 A2 | 12/2002 |
| WO | WO03026358 A1 | 3/2003 |
| WO | WO03055273 A2 | 7/2003 |
| WO | WO03067934 A2 | 8/2003 |
| WO | WO03090890 A1 | 11/2003 |
| WO | WO03096761 A1 | 11/2003 |
| WO | WO2004021747 A2 | 3/2004 |
| WO | WO2004023850 A2 | 3/2004 |
| WO | WO2004032572 A2 | 4/2004 |
| WO | WO2004057924 A1 | 7/2004 |
| WO | WO2004100624 A2 | 11/2004 |
| WO | WO2005031860 A2 | 4/2005 |
| WO | WO2005052751 A2 | 6/2005 |
| WO | WO2005060309 A2 | 6/2005 |
| WO | WO2005116519 A1 | 8/2005 |
| WO | WO2005084339 A2 | 9/2005 |
| WO | WO2005089293 A2 | 9/2005 |
| WO | WO2005089309 A2 | 9/2005 |
| WO | WO2005103555 A1 | 11/2005 |
| WO | WO2006023149 A2 | 3/2006 |
| WO | WO2006044328 A1 | 4/2006 |
| WO | WO2006046207 A2 | 5/2006 |
| WO | WO2006056120 A1 | 6/2006 |
| WO | WO2006093889 A2 | 9/2006 |
| WO | WO2006095315 | 9/2006 |
| WO | WO2006095316 | 9/2006 |
| WO | WO2006127666 A2 | 11/2006 |
| WO | WO2006127785 A2 | 11/2006 |
| WO | WO2006133272 A2 | 12/2006 |

(56) References Cited

FOREIGN PATENT DOCUMENTS

| | | |
|---|---|---|
| WO | WO2006137686 A1 | 12/2006 |
| WO | WO2007004679 A1 | 1/2007 |
| WO | WO2007081674 A1 | 7/2007 |
| WO | WO2007090292 A1 | 8/2007 |
| WO | WO2007094810 A2 | 8/2007 |
| WO | WO2008018002 A2 | 2/2008 |
| WO | WO2008027093 A2 | 3/2008 |
| WO | WO2008061991 A1 | 5/2008 |
| WO | WO2008110978 A1 | 9/2008 |
| WO | WO2008129488 | 10/2008 |
| WO | WO2008137460 | 11/2008 |
| WO | WO2009061124 A2 | 5/2009 |
| WO | WO2009067074 A1 | 5/2009 |
| WO | WO2009111978 A1 | 9/2009 |
| WO | WO2009143047 A2 | 11/2009 |
| WO | WO2010014437 A2 | 2/2010 |
| WO | WO2010030509 A2 | 3/2010 |
| WO | WO2010047896 A2 | 4/2010 |
| WO | WO2010047898 A2 | 4/2010 |
| WO | WO2010047973 A2 | 4/2010 |
| WO | WO2010069983 A1 | 6/2010 |
| WO | WO2010083370 A2 | 7/2010 |
| WO | WO2010088105 A3 | 8/2010 |
| WO | WO2010132625 A2 | 11/2010 |
| WO | WO2010141537 A2 | 12/2010 |
| WO | WO2011005562 | 1/2011 |
| WO | WO2011005579 A2 | 1/2011 |
| WO | WO2011021719 A1 | 2/2011 |
| WO | WO2011072308 A1 | 6/2011 |
| WO | WO2011074884 A2 | 6/2011 |
| WO | WO2011113709 A1 | 9/2011 |
| WO | WO2011117059 A1 | 9/2011 |
| WO | WO2011159436 A2 | 12/2011 |
| WO | WO2012001584 A1 | 1/2012 |
| WO | WO2012004708 A2 | 1/2012 |
| WO | WO2012007899 A1 | 1/2012 |
| WO | WO2012019535 A1 | 2/2012 |
| WO | WO2012025626 A1 | 3/2012 |
| WO | WO2012063174 A2 | 5/2012 |
| WO | WO2012117018 A1 | 9/2012 |
| WO | WO2012129301 A1 | 9/2012 |
| WO | WO2012131522 A1 | 10/2012 |
| WO | WO2012131547 A1 | 10/2012 |
| WO | WO2013028965 A2 | 2/2013 |
| WO | WO2013029960 A1 | 3/2013 |
| WO | WO2013030128 A2 | 3/2013 |
| WO | WO2013045255 A1 | 4/2013 |
| WO | WO2013045439 A1 | 4/2013 |
| WO | WO2013057660 A2 | 4/2013 |
| WO | WO2013079242 A1 | 6/2013 |
| WO | WO2013088299 A1 | 6/2013 |
| WO | WO2013097823 A1 | 7/2013 |
| WO | WO2013098700 A1 | 7/2013 |
| WO | WO2013113548 A1 | 8/2013 |
| WO | WO2013113661 A1 | 8/2013 |
| WO | WO2013121347 A1 | 8/2013 |
| WO | WO2013156905 A1 | 10/2013 |
| WO | WO2013167419 A1 | 11/2013 |

OTHER PUBLICATIONS

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.
Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.
D.N.A.-III, [online], [retrieved Mar. 10, 2009] Retrieved from the PLC Lighting Web Page using Internet <URL: http://www.plclighting.com/product_info.php?cPath=1&products_id=92>.
E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.
E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.
E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.
E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.
E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.
Extended European Search Report for co-pending European Application No. 10 73 2124 mailed on Dec. 13, 2012 in 8 pages.
Extended European Search Report for co-pending European Application No. 09822425.6 mailed on Aug. 30, 2012 in 9 pages.
Extended European Search Report for co-pending European Application No. 10797596.3 mailed on Jan. 17, 2013 in 11pages.
Extended European Search Report for co-pending European Application No. 10736237.8 mailed on Oct. 19, 2012 in 5 pages.
Extended European Search Report for co-pending European Application No. 10738925.6 mailed on Oct. 1, 2012 in 7 pages.
Extended European Search Report for co-pending European Application No. 11760309 maield on Sep. 30, 2013 in 7 pages.
Examination and Search Report mailed on Jul. 2, 2012 in cooresponding United Kingdom Application No. 1018896.9 in 4 pages.
Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.
Hightower et al, "A Survey and Taxonomy of Location Systems for Ubiquitous Computing", University of Washington, Computer Science and Engineering, Technical Report UW-CSE Jan. 8, 2003, IEEE, Aug. 24, 2001 in 29 pages.
International Search Report and Written Opinion dated Jan. 4, 2010 from the corresponding International Application No. PCT/US2009/044313 filed May 18, 2009.
International Search Report and Written Opinion dated Feb. 7, 2011 from the corresponding International Application No. PCT/US2010/039678 filed Jun. 23, 2010.
International Search Report and Written Opinion dated May 7, 2010 from the corresponding International Application No. PCT/US2009/057109 filed on Sep. 16, 2009.
International Search Report and Written Opinion dated Apr. 8, 2010 from the corresponding International Application No. PCT/2009/055114 filed on Aug. 27, 2009.
International Search Report and Written Opinion dated Feb. 8, 2011 from the corresponding International Application No. PCT/US2010/039608 filed Jun. 23, 2010.
International Search Report and Written Opinion dated Dec. 13, 2010 from the corresponding International Application No. PCT/US2010/037006 filed Jun. 2, 2010.
International Search Report and Written Opinion dated Mar. 13, 2012 from the corresponding International Application No. PCT/US2011/052995 filed on Sep. 23, 2011.
International Search Report and Written Opinion dated May 14, 2010 from the corresponding International Application No. PCT/US2009/060085 filed Oct. 9, 2009.
International Search Report and Written Opinion dated Aug. 16, 2010 from the corresponding International Application No. PCT/US2010/021131 filed on Jan. 15, 2010.

(56) References Cited

OTHER PUBLICATIONS

International Search Report and Written Opinion dated Jul. 16, 2009 from the corresponding International Application No. PCT/US2008/084650 filed Nov. 25, 2008.
International Search Report and Written Opinion dated Aug. 17, 2010 from the corresponding International Application No. PCT/US2010/021489 filed on Jan. 20, 2010.
International Search Report and Written Opinion dated Jul. 17, 2009 from the corresponding International Application No. PCT/US2008/085118 filed Dec. 1, 2008.
International Search Report and Written Opinion dated Nov. 21, 2011 from the corresponding International Application No. PCT/US2011/029932 filed on Mar. 25, 2011.
International Search Report and Written Opinion dated Mar. 22, 2010 from the corresponding International Application No. PCT/US2009/053853 filed Aug. 14, 2009.
International Search Report and Written Opinion dated Nov. 23, 2011 from the corresponding International Application No. PCT/US2011/042761 filed on Jul. 1, 2011.
International Search Report and Written Opinion dated Nov. 23, 2011 from the corresponding International Application No. PCT/US2011/042775 filed on Jul. 1, 2011.
International Search Report and Written Opinion dated Dec. 24, 2010 from the corresponding International Application No. PCT/US2010/034635 filed May 13, 2010.
International Search Report and Written Opinion dated May 24, 2010 from the corresponding International Application No. PCT/2009/060083 filed Oct. 9, 2009.
International Search Report and Written Opinion dated May 24, 2010 from the corresponding International Application No. PCT/US2009/060087 filed Oct. 9, 2009.
International Search Report and Written Opinion dated Aug. 25, 2009 from corresponding International Application No. PCT/US2009/031049 filed Jan. 15, 2009.
International Search Report and Written Opinion dated Jan. 25, 2010 from the corresponding International Application No. PCT/US2009/048623 filed Jun. 25, 2009.
International Search Report and Written Opinion dated Feb. 26, 2010 from the corresponding International Application No. PCT/US2009/050949 filed Jul. 17, 2009.
International Search Report and Written Opinion dated Apr. 30, 2010 from the corresponding International Application No. PCT/US2009/057072 filed on Sep. 16, 2009.
International Search Report and Written Opinion dated Jul. 30, 2010 from the corresponding International Application No. PCT/US2010/021448 filed on Jan. 20, 2010.
International Search Report and Written Opinion dated Sep. 30, 2011 from the corresponding International Application No. PCT/US2011/029905 filed on Mar. 25, 2011.
International Search Report and Written Opinion dated Feb. 6, 2012 from the corresponding International Application No. PCT/US2011/043524 filed on Jul. 11, 2011.
International Search Report and Written Opinion dated Feb. 15, 2013 from the corresponding International Application No. PCT/US22012/052244 filed on Aug. 24, 2012.
International Search Report and Written Opinion dated Aug. 30, 2011 for the corresponding International Application No. PCT/US2011/029994 filed Mar. 25, 2011.
International Search Report and Written Opinion dated Aug. 13, 2013 for the corresponding International Application No. PCT/US2013/028669 filed Mar. 1, 2013.
International Search Report and Written Opinion dated Sep. 23, 2013 for the corresponding International Application No. PCT/US2013/049432 filed Jul. 5, 2013.
International Search Report and Written Opinion dated Oct. 10, 2013 for the corresponding International Application No. PCT/US2013/049427 filed Jul. 5, 2013.

Notification of Transmittal, the International Search Report and the Written Opinion of the International Searching Authority dated May 7, 2012, from the corresponding International Application No. PCT/US2011/064151.
Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.
LCD Optics 101 Tutorial [online]. 3M Corporation, [retrieved on Jan. 6, 2010]. Retrieved from the internet: <URL: http://solutions.3m.com/wps/portal/3M/en_US/Vkuiti1/BrandProducts/secondary/optics101/>.
LED Lights, Replacement LED lamps for any incandescent light, [online], [retrieved on Jan. 13, 2000] Retrieved from LED Lights Web Page using Internet <URL: http://www.ledlights.com/replac.htm>.
LEDTRONICS, LEDTRONICS Catalog, 1996, p. 10, LEDTRONICS, Torrance, California.
Phason Electronic Control Systems, Light Level Controller (LLC) case study. Nov. 30, 2004. 3 pages, Phason Inc., Winnipeg, Manitoba, Canada.
Philips. Sense and Simplicity—Licensing program for LED Luminaires and Retrofits, Philips Intellectual Property & Standards, May 5, 2009.
Piper. The Best Path to Efficiency. Building Operating Management, Trade Press Publishing Company May 2000. [online], [retrieved on Jan. 17, 2008]. Retrieved from Find Articles Web Page using Internet <URL:http://findarticles.com/p/articles/mi_qu3922/is_200005/ai_n8899499/>.
PLC-81756-AL "Fireball" Contemporary Pendant Light, [online], [retrieved on Feb. 27, 2009] Retrieved from the Arcadian Lighting Web Page using Internet <URL: http://www.arcadianlighting.com/plc-81756-al.html>.
PLC-96973-PC PLC Lighting Elegance Modern/Contemporary Pendant Light, [online], [retrieved on Feb. 27, 2009]. Retrieved from the Arcadian Lighting Web Page using Internet <URL: http/www.arcadianlighting.com/plc-96978-pc.html>.
Saha et al, "Location Determination of a Mobile Device using IEEE 802.11 Access Point Signals", May 5, 2002 in 20 pages.
Sensor Switch, nLight Lighting Control System, [online], [retrieved on Jan. 11, 2008] Retrieved from Sensor Switch web page using Internet <URL: http://www.sensorswitch.com>.
Six Strategies, [online], [retrieved on Jan. 11, 2008] Retrieved from Encelium Technologies Inc. Web Page using Internet <URL: http://www.enceliurn.com/products/strategies.html>.
Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.
Supplementary European Search Report for corresponding European Application No. 10797603.7 mailed Aug. 5, 2013 in 5 pages.
Supplementary European Search Report for corresponding European Application No. 09822381.1 mailed Jan. 4, 2013 in 5 pages.
Supplementary European Search Report dated Feb. 22, 2012 from European Patent Application No. 09822424.9.
Telecite Products & Services—Display Options, [online], [retrieved on Jan. 13, 2000] Retrieved from Telecite Web page using Internet <URL: http://www.telecite.com/en/products/options en.htm>.
Traffic Signal Products—Transportation Products Group, [online], [retrieved on Jan. 13, 2000] Retrieved from the Dialight Web Page using Internet <URL: http://www.dialight.com/trans.htm>.
Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.
Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.
Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

(56) References Cited

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

Notification of Transmittal, the International Search Report and the Written Opinion of the International Searching Authority dated May 7, 2012 from the corresponding International Application No. PCT/US2011/058312.

Bose, "Modern Power Electronics, Evolution, Technology and Applications", 1992, IEEE Press, pp. 14-15.

Kularatna, "Power Electronics Design Handbook, Low-power Components and Applications", 1998, Newns, pp. 71-75.

Lighting Handbook, 8th Edition, Illuminating Engineering Society of North America, 1993, pp. 237-240.

Hodapp, "Chapter 6: Applications for High-Brightness Light-Emitting Diodes", Hodapp, Academic Press, 1997, pp. 334-336, "High Brightness Light Emitting Diodes", Stringfellow et al., volume editors.

* cited by examiner

INTEGRATION OF LED LIGHTING WITH BUILDING CONTROLS

STATEMENT OF RELATED CASES

The present application is a continuation of U.S. patent application Ser. No. 13/491,961, filed Jun. 8, 2012, which is a continuation of U.S. patent application Ser. No. 12/572,601, filed Oct. 2, 2009, now U.S. Pat. No. 8,214,084, which in turn claims priority from U.S. Provisional Patent Application Ser. No. 61/108,358, filed Oct. 24, 2008, all of which are incorporated by reference herein in their entireties.

FIELD

An LED-based light as described herein relates to "smart buildings" that can automatically control various environmental characteristics of one or more rooms in a building.

BACKGROUND

Buildings typically include various systems for controlling conditions inside the buildings, such as heating, ventilating, and air conditioning (HVAC) systems and lighting systems. HVAC systems and lighting systems generally operate independent from one another. For example, a thermostat can be set to control operation of an HVAC system, while a lighting system can be turned on and off using a wall-mounted switch.

SUMMARY

Known smart buildings that can automatically control various environmental characteristics of one or more rooms of a building are typically expensive to manufacture and install. For example, known smart building components typically are not compatible with standard building fixtures, such as conventional fluorescent tube fixtures, and thus can require an electrician to install.

Examples of LED-based lights described herein can be used to transform a building with standard fixtures, such as standard fluorescent tube fixtures, into a smart building. Many advantages are offered by the LED-based lights described herein, such as allowing for a low-cost smart building.

Examples of systems for use in conjunction with a conventional light fixture that are configured to receive a standardized electrical connector of a conventional light are described herein. In one such example, the system includes a sensor operable to output a first signal indicative of whether an area in a building is in an occupied state or a non-occupied state and an LED-based light. The LED-based light includes at least one electrical connector compatible with the conventional light fixture, at least one LED, an LED controller operable to control the at least one LED in response to the first signal, and a transmitter operable to transmit a second signal indicative of whether the area is in the occupied state or the non-occupied state to the regulator controller. The system also includes a regulator controller remote from the LED-based light and is operable to control an environmental condition in the building in response to the second signal.

Examples of LED-based lights compatible with a standard light fixture are also described herein. In one such example, the LED-based light includes a tube including a light transmitting portion, a pair of electrical connectors attached to opposing ends of the tube, the pair of electrical connectors compatible with the standard fluorescent light fixture; at least one LED operable to produce light that passes through the light transmitting portion of the tube; a sensor operable to output a first signal indicative of whether one or rooms in a building is in an occupied state or a non-occupied state; an LED controller operable to control the at least one LED in response to the first signal, and a transmitter operable to output a second signal indicative of whether the area is in the occupied state or the non-occupied state to a regulator controller remote from the LED-based light and operable to control at least one function in the building in response to the second signal, wherein the at least one function is other than controlling the LED-based light.

Examples of methods for controlling an environmental condition in a building using an LED-based light including at least one electrical connector compatible with a conventional light fixture and at least one LED are also disclosed herein. In one such example, the method includes outputting a first signal indicative of whether an area in a building is in an occupied state or a non-occupied state and controlling the at least one LED in response to the first signal. The method also includes transmitting a second signal indicative of whether the area is in the occupied state or the non-occupied state to a location remote from the LED-based light and controlling at least one function in the building in response to the second signal, wherein the at least one function is other than controlling the LED-based light.

These and other examples will be described in additional detail hereafter.

DESCRIPTION

Figure 1:
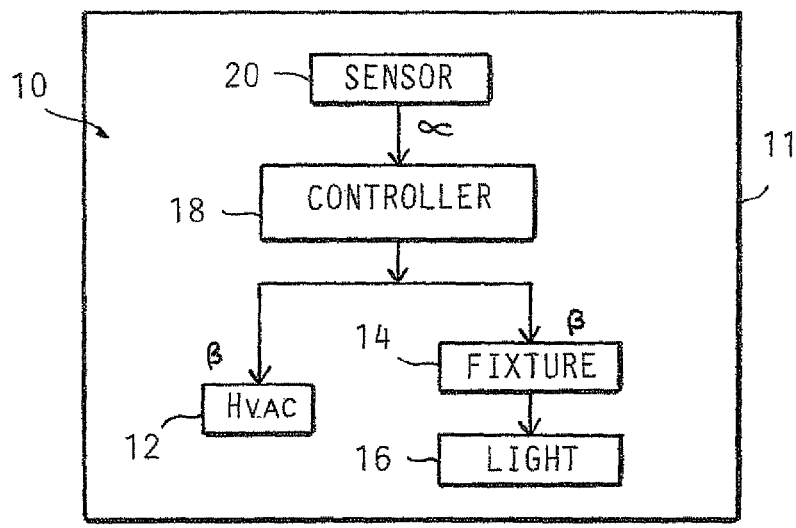
FIG. 1 is a schematic diagram of a smart building system.

FIGS. 1-4 show components of smart building systems. As shown in FIG. 1, a smart building system 10 for use in a building 11 can include an HVAC system 12, a light fixture 14, an LED-based light 16, a controller 18, and one or more sensors 20. The HVAC system 12 can include known HVAC components, such as a heater, an air conditioner, fans, a thermostat, and ductwork. The HVAC system 12 can regulate the temperature, humidity, and/or other air quality considerations in one or more rooms of the building 11. For example, the HVAC system 12 can maintain the temperature in one or more rooms of the building 11 at a level near a setpoint temperature input to the thermostat. The HVAC system 12 can also be capable of controlling airflow between the building 11 and the environment surrounding the building 11, such as by opening or closing vents, windows, skylights, and other barriers between the building 11 and the surrounding environment. In addition or alternative to the HVAC system 12, the smart building system 10 can include another type of temperature control system (e.g., a control for heated floors), another type of light control system (e.g., a control for window shades or dynamically tinted windows), or some other control for the building 11. The HVAC system 12 can be in communication with the controller 18 as is described below in greater detail.

The light fixture 14 can be designed to accept standard fluorescent tubes, such as a T-5, T-8, or T-12 fluorescent tube, or other standard sized light, such as incandescent bulbs.

Alternatively, the fixture 14 can be designed to accept non-standard sized lights, such as lights installed by an electrician. Additionally, the fixture 14 can include one or more fixtures. The fixture 14 can be in communication with the controller 18 for controlling the operation of the light 16 as is described below in greater detail.

Figure 2:
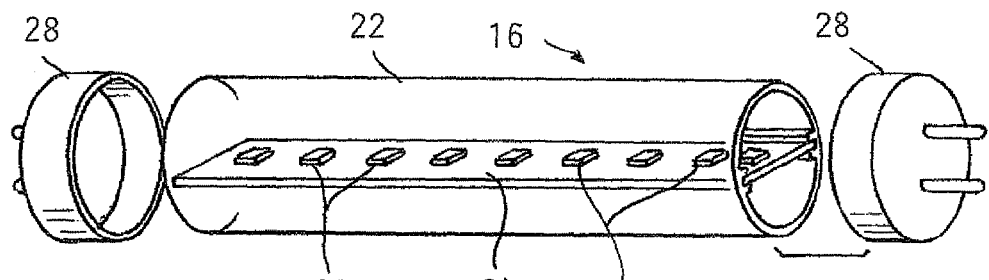
FIG. 2 is a perspective view of an example of an LED light tube.

The LED light tube 16 can include a housing 22, a circuit board 24, LEDs 26, and a pair of end caps 28 as shown in FIG. 2. The housing 22 as shown in FIG. 2 is light transmitting and has the shape of a cylindrical tube. The housing 22 can be made from polycarbonate, acrylic, glass or another light transmitting material (i.e., the housing 22 can be transparent or translucent). For example, a translucent housing 22 can be made from a composite, such as polycarbonate with particles of a light refracting material interspersed in the polycarbonate. While the illustrated housing 22 is cylindrical, housings having a square, triangular, polygonal, or other cross sectional shape can alternatively be used. Similarly, while the illustrated housing 22 is linear, housings having an alternative shape, e.g., a U-shape or a circular shape can alternatively be used. Additionally, the housing 22 need not be a single piece as shown in FIG. 2. Instead, another example of a housing can be formed by attaching multiple individual parts, not all of which need be light transmitting. For example, such a housing can include an opaque lower portion and a lens or other transparent cover attached to the lower portion to cover the LEDs 26. The housing 22 can be manufactured to include light diffusing or refracting properties, such as by surface roughening or applying a diffusing film to the housing 22. For compatibility with the fixture 14 as discussed above, the housing 22 can have a length such that the light 16 is approximately 48" long, and the housing 22 can have a 0.625", 1.0", or 1.5" diameter.

The circuit board 24 as illustrated in FIG. 2 is an elongate printed circuit board. Multiple circuit board sections can be joined by bridge connectors to create the circuit board 24. The circuit board 24 as shown in FIG. 2 is slidably engaged with the housing 22, though the circuit board 24 can alternatively be clipped, adhered, snap- or friction-fit, screwed or otherwise connected to the housing 22. For example, the circuit board 24 can be mounted on a heat sink that is attached to the housing 22. Also, other types of circuit boards may be used, such as a metal core circuit board. Or, instead of a circuit board 24, other types of electrical connections (e.g., wires) can be used to electrically connect the LEDs 26 to a power source.

The light 16 can include two bi-pin end caps 28 (i.e., each end cap 28 can carry two pins), one at each longitudinal end of the housing 22, for physically and electrically connecting the light 16 to the fixture 14. The end caps 28 can be the sole physical connection between the light 16 and the fixture 14. The end caps 28 can be electrically connected to the circuit board 24 to provide power to the LEDs 26. Each end cap 28 can include two pins, though two of the total four pins can be "dummy pins" that do not provide an electrical connection. Alternatively, other types of electrical connectors can be used, such as an end cap carrying a single pin. Also, while the end caps 28 are shown as including cup-shaped bodies, the end caps 28 can have a different configuration (e.g., the end caps 28 can be shaped to be press fit into the housing 22). One or both of the end caps 28 can additionally include electric components, such as a rectifier and filter.

The LEDs 26 can be surface-mount devices of a type available from Nichia, though other types of LEDs can alternatively be used. For example, although surface-mounted LEDs 26 are shown, one or more organic LEDs can be used in place of or in addition thereto. The LEDs 26 can be mounted to the circuit board 24 by solder, a snap-fit connection, or other means. The LEDs 26 can produce white light. However, LEDs that produce blue light, ultra-violet light or other wavelengths of light can be used in place of white light emitting LEDs 26.

The number of LEDs 26 can be a function of the desired power of the light 16 and the power of the LEDs 26. For a 48" light, such as the light 16, the number of LEDs 26 can vary from about five to four hundred such that the light 16 outputs approximately 500 to 3,000 lumens. However, a different number of LEDs 26 can alternatively be used, and the light 16 can output a different amount of lumens. The LEDs 26 can be evenly spaced along the circuit board 24, and the spacing of the LEDs 26 can be determined based on, for example, the light distribution of each LED 26 and the number of LEDs 26.

While the light 16 is shown as being compatible with standard sized fluorescent fixtures, an LED-based light having another shape, such as an incandescent bulb or another type of light, can alternatively be used. Also, other types of light sources, such as fluorescent or incandescent based light sources, can be used instead of the LEDs 26.

Referring again to FIG. 1, the controller 18 can include a memory and a CPU for executing a program stored on the memory. The controller 18 can be in communication with the sensor 20 for receiving a detection signal α from the sensor 20 as is described below in greater detail. Additionally, the controller 18 can be in communication with the HVAC system 12 and fixture 14 for controlling operation of the HVAC system 12 and the output of the light 16. For example, the controller 18 can be in communication with the various components of the HVAC system 12 for controlling their respective operation, and the controller 18 can further control the amount of power supplied by the fixture 14 to the light 16. Also, the controller 18 can include multiple controllers, such as a controller for a heating portion of the HVAC system 12, another controller for a ventilation portion of the HVAC system, and yet another controller coupled to the fixture 14 for controlling the amount of power supplied to the light 16.

The sensor 20 can include a motion sensor, a sensor for determining whether a door is ajar, a sensor for determining when a keypad or other type of lock is actuated, a voice-activated sensor, a clock or calendar, an ambient light sensor, a power supply monitor, and/or another type of sensor. The sensor 20 can include multiple types of sensors for detecting different types of activities (e.g., the sensor 20 can include a clock and a motion sensor). Additionally, the sensor 20 can include multiple sensors in different rooms or spaces of the building 11.

In operation, the sensor 20 can perform detection and, in response, send the detection signal α to the controller 18. The detection signal α can indicate whether the building 11 is in an occupied state or an unoccupied state. For example, if the sensor 20 includes a motion detector, the sensor 20 can send the detection signal α to the controller 18 to indicate the building is in the occupied state when motion is detected. The sensor 20 can continuously send the detection signal α to the controller 18, or the sensor 20 can send the detection signal α only when a positive detection (e.g., an indication that the building is in the occupied state) occurs. The detection signal α can also indicate that the building is in the unoccupied state when, for example, a predetermined amount of time has passed since a positive detection last occurred, or when the sensor 20 includes a clock and the time is past normal working hours. Also, the detection signal α can include signals from multiple types of sensors making up the sensor 20, such as a voice-activated sensor, a motion sensor, and a clock. If the controller 18 receives signals from multiple sensors 20 in different locations, the detection signal α can include a location of the detection (e.g., a specific room or area of the building 11).

Also in operation, the controller 18 can control the function of the HVAC system 12 and the light 16 in response to the detection signal α, such as when the detection signal α indicates the building state has changed from the occupied state to the unoccupied state and vice versa. For example, the controller 18 can output a control signal β to turn on the HVAC system 12 and the light 16 in response to a detection signal α indicating the building is in the occupied state, and the controller 18 can output the control signal β to turn off the HVAC system 12 and the light 16 in response to an indication that the building is in the unoccupied state.

Additionally, the control signal β output by the controller 18 can do more than control the HVAC system 12 and light 16 between on and off states depending solely on whether the building 11 is occupied or unoccupied. That is, the controller 18 can analyze the detection signal α to determine the control signal β. The control signal β can be based on the efficiency of the smart building system 10. For example, the control signal β can control a temperature setting of the HVAC system 12 (e.g., either by altering or overriding the setpoint temperature on the thermostat of the HVAC system 12) in order to allow the temperature in an area of the building 11 to increase during a warm night or decrease during a cool night 11. As a result, the HVAC system 12 can use less power during periods of time when the temperature of the building 11 can vary without making occupants uncomfortable. As another example, the control signal β can control the HVAC system 12 to open one or more barriers between the building 11 and the external environment when the temperature of the external environment is closer to the setpoint temperature than the temperature in the building 11, thereby reducing the power consumption of the HVAC system 12. As yet another example, the control signal β can reduce the amount of power provided to the fixture 14 to dim the lights 16, such as when the detection signal α indicates that an amount of ambient light is high or when the detection signal α indicates that the time is after working hours in order to reduce the power consumption of the lights 16. Similarly, the control signal β can turn on the lights 16 when an occupant is detected, making the lights 16 more convenient to operate.

Further, if the detection signal α includes signals from multiple types of sensors making up the sensor 20, the controller 18 analyzes the detection signal α to determine the control signal β. For example, if the sensor 20 includes a clock and a motion sensor, the controller 18 can be configured to output the control signal β based on the detection signal α output by the clock portion of the sensor 20 on weekdays (e.g., to reduce the power supplied to the HVAC system 12 and/or the lights 16 after working hours) and based on the detection signal α output by the motion sensor portion of the sensor 20 on weekends (e.g., to provide power to the HVAC system 12 and/or the lights 16 when the building is in the occupied state). As another example, if the sensor 20 includes a voice-activated sensor and a keypad, the controller 18 can be configured to output the control signal β based on the signal output by the voice-activated portion of the sensor 20 and not based on the keypad portion of the sensor 20 when warranted by the signal detected by the voice-activated portion of the sensor 20 (e.g., the controller 18 can send the control signal β to eliminate power to the light 16 in an area of the building 11 in response to a detection signal α corresponding to a command similar to "Turn off the lights" detected by the voice-activated portion of the sensor 20 even though the keypad portion of the sensor 20 indicates one or more people are present in the area of the building 11).

The controller 18 can also analyze the detection signal α to determine likely future areas people will occupy and output the control signal β accordingly. For example, if the controller 18 receives a detection signal α indicating that a keypad portion of the sensor 20 detects actuation of a keypad outside a door at one end of a hallway, the controller 18 can control the HVAC system 12 and/or the lights 16 in the hallway and in rooms adjacent to the hallway in anticipation of those rooms being occupied. As another example, if the controller 18 receives a detection signal α indicating that a motion sensor portion of a sensor 20 detects the presence of motion outside a main entry to the building 11, the controller 18 can control lights 16 in a lobby.

As another example of operation of the smart building system 10, if the sensor 20 includes a power supply monitor, the detection signal α can indicate an amount of power used by the building 11 or certain systems of the building (e.g., an amount of power used in the aggregate by the HVAC system 12 and the light 16). Alternatively, instead of receiving the detection signal α expressly indicating an amount of power used by the building 11, the controller 18 can estimate the building power usage based on, e.g., the time of day if the sensor 20 includes a clock, the time of year if the sensor 20 includes a calendar, the number of areas of the building 11 occupied, and/or other considerations. That is, the estimate can be based on assumptions such as the building 11 using less power at night, the building 11 using more power during cold weather, the building 11 using more power when heavily occupied, and other assumptions.

The controller 18 can analyze the power consumption of the building 11 to determine the control signal β. For example, when the power consumption is high (e.g., above a predetermined amount), the controller 18 can reduce an amount of power provided to the light 16, thereby dimming the light 16. As another example, the controller 18 can determine or estimate which spaces of the building 11 are occupied, and only provide light to those areas (or not reduce light to those areas) during times of high power consumption. The controller 18 can allow occupants to override the control signal β if the amount of light provided by the light 16 is not deemed appropriate by occupants. Similarly, the controller 18 can control the HVAC system 12 based on the power consumption of the building 11, such as by allowing the temperature in unoccupied areas of the building 11 to increase or decrease.

Thus, as explained in various examples above, the control signal β can be solely based on, partially based on, or not based on whether the building 11 is in the occupied state or unoccupied state. Among other advantages, the smart building system 10 can allow for energy efficient operation of the HVAC system 12 and the light 16 as explained in various examples above. Additionally, the controller 18 can control operation of the HVAC system 12 and light 16 without effort by occupants of the building 11, such as by eliminating the need for occupants to turn the light 16 on or off upon entering and exiting the an area of the building 11. The controller 18 can also control the HVAC system 12 and/or light 16 based on the power drawn by the building 11 to, for example, reduce the power consumption of the HVAC system 12 and/or light 16 during times of high power consumption.

Figure 3:
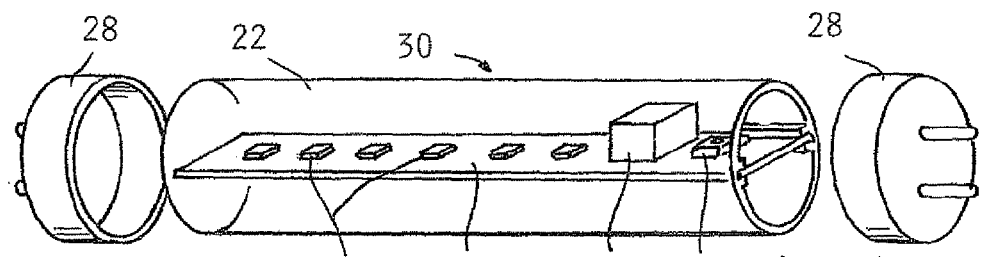
FIG. 3 is a perspective view of another example of an LED light tube.

While the light 16 in the smart building system 10 of FIG. 1 is controlled by a controller 18 separate from the light 16, another example of a light 30 as shown in FIG. 3 can include a controller 32 mounted on the circuit board 24. That is, in addition to the housing 22, circuit board 24, LEDs 26, and end caps 28, the light 30 can include the controller 32. The controller 32 can include a CPU and a memory storing a program to be executed by the CPU, and the controller 32 can be in communication with the LEDs 26 via the circuit board 24 or by other means (e.g., wires separate from the circuit board 24). Also, while the light 30 is shown and described as being shaped for compatibility with a fluorescent tube accepting fixture, the light 30 can have an alternative shape, such as an incandescent bulb or another type of light, and can use alternative sources of light, such as an incandescent, fluorescent, or halogen light.

In order to receive the detection signal α, the light 30 can additionally include a receiver 34 mounted on the circuit board 24. The sensors 20 can be in communication with a transmitter (not shown) for transmitting the detection signal α to the receiver 34. For example, the receiver 34 can be in communication with the transmitter using a standard wireless protocol (e.g., a radio standard, a cellular standard such as 3G, Bluetooth, or WiFi). The receiver 34 can alternatively be in communication with the transmitter in another manner such as hardwiring or via electric signals sent through the end caps 28. The receiver 34 can also be in communication with the controller 32 (e.g., the controller 32 and receiver 34 can communicate via the circuit board 24, or the controller 32 and receiver 34 can be an integral unit), allowing the receiver 34 to communicate the detection signal α to the controller 32. The controller 32 can control the LEDs 26 in response to the detection signal α detected by the sensors 20 similar to the controller 18 controlling the light 16 described above in reference to FIG. 1.

In addition to the advantages described above with reference to the smart building system 10, integrating the receiver 34 with the light 30 of FIG. 3 can allow for easy installation of the light 30. For example, many buildings include standard fluorescent fixtures for accepting the light 30. Since the receiver 34 can be wireless, the light 30 can be installed in a standard fluorescent fixture as easily as a normal fluorescent tube.

Figure 4:
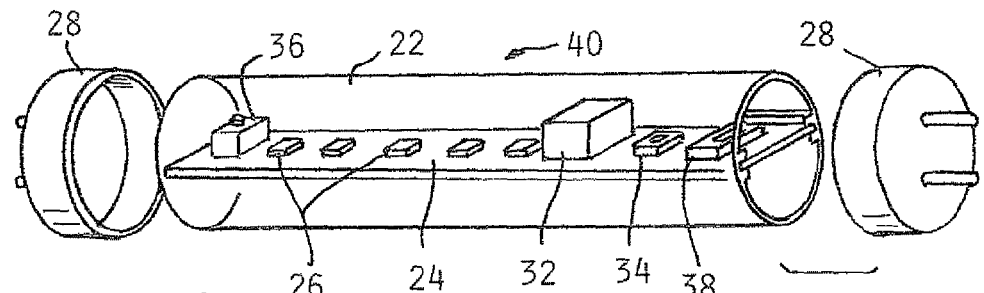
FIG. 4 is a perspective view of yet another example of an LED light tube.

While the lights 16 and 30 are described as separate from sensors 20, a light 40 as shown in FIG. 4 can include the housing 22, the circuit board 24, LEDs 26, end caps 28, the controller 32, the receiver 34, and a sensor 36 mounted on the circuit board 24. Like the sensor 20, the sensor 36 can include a motion sensor, a voice-activated sensor, a clock or calendar, an ambient light sensor, and/or another type of sensor. The sensor 36 can include multiple types of sensors for detecting different types of activities (e.g., the sensor 36 can include a clock and a motion sensor). The sensor 36 can be in communication the controller 32 via the circuit board 24 or by other means, such as being hardwired to the controller 32 or formed integrally with the controller 32. The light 40 can additionally include a transmitter 38 for communicating by way of a standard wireless protocol or other means (e.g., hardwiring) to a remote location, such as a smart building control center. The transmitter 38 can be in communication with the sensor 36 via the circuit board or by other means, such as being hard wired to the sensor 36 or formed integrally with the sensor 36.

In operation, the sensor 36 can perform detection and, in response, send the detection signal α to the controller 32. The controller 32 can perform at least one of a variety of functions in response to the detection signal α. The controller 32 can control the LEDs 26 based on whether the area of the building 11 in which the light 40 is located is occupied or unoccupied. For example, a motion sensor portion of the sensor 36 can indicate whether the area of the building 11 in which the light 40 is located is occupied, and the controller 32 can turn the LEDs 26 on or off (or otherwise control the LEDs 26) based on the detection signal α.

Further, including the transmitter 38 allows the light 40 to communicate the detection signal α to a remote location, such as a smart building control center that can control operation of other building systems (e.g., an HVAC system). Thus, the detection signal α picked up by the sensor 36 can be used as an input to control portions of a smart building other than the light 40. As an example, if the sensor 36 includes a motion detector, a smart building control center can alter the control of an HVAC system when the sensor 36 indicates a predetermined amount of time has passed since motion was last detected.

The light 40 can also include the receiver 34. Including the receiver 34 allows the controller 32 of the light 40 to control the LEDs 26 based on signals picked up from sensors 20 outside the light 40, such as a power supply sensor or a remote ambient light sensor (though an ambient light sensor integral with the light 40 can alternatively or additionally be used). The controller 32 can control the LEDs 26 in the light 40 based on, for example, a low power availability indication transmitted to the receiver 34. Thus, the controller 32 can reduce the power consumption of the LEDs 26 during times that the building 11 is using a large amount of power, when a generator is providing power, or at other times during which power should be conserved.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed:

1. A system for use in conjunction with a conventional light fixture that is configured to receive a standardized electrical connector of a conventional light, the system comprising:
    a sensor operable to output a first signal indicative of whether an area in a building is in an occupied state or a non-occupied state;
    an LED-based light including:
        at least one LED,
        an LED controller operable to receive the first signal and control the at least one LED in response to the first signal,
        a transmitter operable to transmit a second signal indicative of whether the area is in the occupied state or the non-occupied state,
        a housing for the at least one LED, the LED controller and the transmitter, and
        at least one electrical connector disposed at an end of the housing, the electrical connector compatible with the conventional light fixture; and
    a regulator controller remote from the LED-based light and operable to receive the second signal and control an environmental condition in the building other than artificial light in response to the second signal.

2. The system of claim 1, wherein the at least one LED, the LED controller and the transmitter are in electrical communication with the at least one electrical connector.

3. The system of claim 1, wherein the LED-based light further includes a circuit board, and wherein the at least one LED, the LED controller, and the transmitter are mounted on the circuit board and in electrical communication therewith.

4. The system of claim 3, wherein the circuit board is in electrical communication with the at least one electrical connector.

5. The system of claim 1, wherein the at least one electrical connector includes a pair of bi-pin connectors configured for engagement with a standard fluorescent tube receiving fixture.

6. The system of claim 1, wherein the sensor detects one or more of motion and sound.

7. The system of claim 1, wherein the first signal is at least partially based on at least one of a time of day and a day of the week.

8. The system of claim 1, wherein the sensor is included in the LED-based light.

9. The system of claim 1, wherein the environmental condition includes at least one of a temperature setting, an airflow setting, a humidity setting, or a brightness.

10. A system for controlling an environmental condition, comprising:
   an LED-based light configured for replacing a conventional light in a light fixture, the LED-based light including:
      at least one LED,
      a sensor operable to output a signal indicative of whether an area surrounding the LED-based light is in an occupied state or a non-occupied state, and
      a transmitter in communication with the sensor and operable to transmit the signal,
      a housing for the at least one LED, the sensor and the transmitter, and
      at least one electrical connector disposed at an end of the housing, the electrical connector compatible with the conventional light fixture; and
   a regulator controller remote from the LED-based light and in communication with the transmitter, the regulator controller operable to control an environmental condition in the area other than artificial light based on the signal.

11. The system of claim 10, wherein the at least one LED, the sensor and the transmitter are in electrical communication with the at least one electrical connector.

12. The system of claim 10, wherein the LED-based light further includes a circuit board, and wherein the at least one LED, the sensor and the transmitter are mounted on the circuit board and in electrical communication therewith.

13. The system of claim 12, wherein the circuit board is in electrical communication with the at least one electrical connector.

14. The system of claim 10, wherein the at least one electrical connector includes a pair of bi-pin connectors configured for engagement with a standard fluorescent tube receiving fixture.

15. The system of claim 10, wherein the environmental condition is an air quality consideration.

16. The system of claim 10, wherein the sensor detects one or more of motion and sound.

17. The system of claim 10, wherein the signal is at least partially based on at least one of a time of day and a day of the week.

18. The system of claim 10, wherein the environmental condition includes at least one of a temperature setting, an airflow setting, a humidity setting, or a brightness.

19. The system of claim 10, wherein the LED-based light further includes an LED controller in communication with the at least one LED and the sensor, the LED controller operable to control the at least one LED in response to the first signal.

* * * * *